(12) United States Patent
Taylor et al.

(10) Patent No.: US 10,573,103 B2
(45) Date of Patent: *Feb. 25, 2020

(54) APPARATUS, METHOD AND ARTICLE FOR PHYSICAL SECURITY OF POWER STORAGE DEVICES IN VEHICLES

(71) Applicant: Gogoro Inc., Hong Kong (CN)

(72) Inventors: Matthew Whiting Taylor, North Bend, WA (US); Yi-Tsung Wu, New Taipei (TW); Hok-Sum Horace Luke, Mercer Island, WA (US); Huang-Cheng Hung, Taoyuan (TW)

(73) Assignee: Gogoro Inc., Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/912,328

(22) Filed: Mar. 5, 2018

(65) Prior Publication Data

US 2018/0257603 A1 Sep. 13, 2018

Related U.S. Application Data

(63) Continuation of application No. 15/011,053, filed on Jan. 29, 2016, now Pat. No. 9,908,506, which is a
(Continued)

(51) Int. Cl.
*G07C 5/08* (2006.01)
*H02J 7/00* (2006.01)
(Continued)

(52) U.S. Cl.
CPC ............. *G07C 5/0858* (2013.01); *B60L 1/00* (2013.01); *B60L 1/003* (2013.01); *B60L 1/02* (2013.01);
(Continued)

(58) Field of Classification Search
CPC ........ B60R 25/04; B60L 3/12; B60L 11/1879; B60L 11/18; B60L 1/00; B60L 11/1874;
(Continued)

(56) References Cited

U.S. PATENT DOCUMENTS

| 1,387,848 A | 8/1921 | Good |
| 3,470,974 A | 10/1969 | Pefine |

(Continued)

FOREIGN PATENT DOCUMENTS

| CA | 2865976 | 9/2013 |
| CN | 1277414 | 12/1990 |

(Continued)

OTHER PUBLICATIONS

"Inrunner," retrieved from http://en.wikipedia.org/w/index.php?title=Inrunner&printable=yes on Sep. 28, 2011, 1 page.
(Continued)

*Primary Examiner* — Rodney A Butler
(74) *Attorney, Agent, or Firm* — Perkins Coie LLP

(57) ABSTRACT

A network of collection, charging and distribution machines collect, charge and distribute portable electrical energy storage devices (e.g., batteries, supercapacitors or ultracapacitors). To avoid theft and tampering of the portable electrical energy storage devices, by default, each portable electrical energy storage device is locked in and operably connected to the vehicle to which it provides power unless the vehicle comes within the vicinity of a collection, charging and distribution machine or other authorized external device such as that in a service center. Once within the vicinity of a collection, charging and distribution machine or other authorized external device a locking mechanism in the vehicle or within the portable electrical energy storage device unlocks and allows the portable electrical energy storage device to be exchanged or serviced.

20 Claims, 8 Drawing Sheets

Related U.S. Application Data continuation of application No. 14/012,845, filed on Aug. 28, 2013, now Pat. No. 9,275,505, which is a continuation of application No. 13/559,054, filed on Jul. 26, 2012, now Pat. No. 8,560,147.

(60) Provisional application No. 61/511,900, filed on Jul. 26, 2011, provisional application No. 61/647,936, filed on May 16, 2012, provisional application No. 61/534,753, filed on Sep. 14, 2011, provisional application No. 61/534,761, filed on Sep. 14, 2011, provisional application No. 61/534,772, filed on Sep. 14, 2011, provisional application No. 61/511,887, filed on Jul. 26, 2011, provisional application No. 61/647,941, filed on May 16, 2012, provisional application No. 61/511,880, filed on Jul. 26, 2011, provisional application No. 61/557,170, filed on Nov. 8, 2011, provisional application No. 61/581,566, filed on Dec. 29, 2011, provisional application No. 61/601,404, filed on Feb. 21, 2012, provisional application No. 61/601,949, filed on Feb. 22, 2012, provisional application No. 61/601,953, filed on Feb. 22, 2012.

(51) Int. Cl.

| | | |
|---|---|---|
| H01M 10/42 | (2006.01) | |
| H01M 10/44 | (2006.01) | |
| H01M 10/48 | (2006.01) | |
| B60L 15/20 | (2006.01) | |
| B60L 3/00 | (2019.01) | |
| B60L 7/06 | (2006.01) | |
| B60L 7/14 | (2006.01) | |
| B60L 7/22 | (2006.01) | |
| G06Q 30/02 | (2012.01) | |
| G07F 17/00 | (2006.01) | |
| B60R 25/04 | (2013.01) | |
| E05B 47/00 | (2006.01) | |
| E05B 81/04 | (2014.01) | |
| H02J 4/00 | (2006.01) | |
| G06F 3/06 | (2006.01) | |
| B60L 50/50 | (2019.01) | |
| B60L 53/14 | (2019.01) | |
| B60L 50/40 | (2019.01) | |
| B60L 50/51 | (2019.01) | |
| B60L 53/80 | (2019.01) | |
| B60L 53/30 | (2019.01) | |
| B60L 55/00 | (2019.01) | |
| B60L 53/65 | (2019.01) | |
| B60L 53/66 | (2019.01) | |
| B60L 53/10 | (2019.01) | |
| B60L 58/10 | (2019.01) | |
| B60L 58/16 | (2019.01) | |
| B60L 58/12 | (2019.01) | |
| B60L 58/21 | (2019.01) | |
| B60L 58/26 | (2019.01) | |
| B60L 50/60 | (2019.01) | |
| B60L 50/64 | (2019.01) | |
| B60L 53/68 | (2019.01) | |
| B60L 1/00 | (2006.01) | |
| B60L 1/02 | (2006.01) | |
| B60L 1/14 | (2006.01) | |
| E05B 81/56 | (2014.01) | |
| G07C 5/00 | (2006.01) | |
| G01C 21/34 | (2006.01) | |
| G06Q 10/02 | (2012.01) | |
| G05B 19/05 | (2006.01) | |
| G07C 9/00 | (2020.01) | |
| B60L 3/12 | (2006.01) | |
| G05F 1/66 | (2006.01) | |
| G06Q 30/06 | (2012.01) | |
| G01C 21/36 | (2006.01) | |
| G07F 15/00 | (2006.01) | |
| G07F 17/12 | (2006.01) | |

(52) U.S. Cl.
CPC ............... *B60L 1/14* (2013.01); *B60L 3/003* (2013.01); *B60L 3/0046* (2013.01); *B60L 3/0061* (2013.01); *B60L 3/0069* (2013.01); *B60L 3/12* (2013.01); *B60L 7/06* (2013.01); *B60L 7/14* (2013.01); *B60L 7/22* (2013.01); *B60L 15/2045* (2013.01); *B60L 50/40* (2019.02); *B60L 50/50* (2019.02); *B60L 50/51* (2019.02); *B60L 50/64* (2019.02); *B60L 50/66* (2019.02); *B60L 53/11* (2019.02); *B60L 53/14* (2019.02); *B60L 53/30* (2019.02); *B60L 53/305* (2019.02); *B60L 53/65* (2019.02); *B60L 53/665* (2019.02); *B60L 53/68* (2019.02); *B60L 53/80* (2019.02); *B60L 55/00* (2019.02); *B60L 58/10* (2019.02); *B60L 58/12* (2019.02); *B60L 58/16* (2019.02); *B60L 58/21* (2019.02); *B60L 58/26* (2019.02); *B60R 25/04* (2013.01); *E05B 47/0001* (2013.01); *E05B 81/04* (2013.01); *E05B 81/56* (2013.01); *G01C 21/3476* (2013.01); *G01C 21/3682* (2013.01); *G05B 19/05* (2013.01); *G05F 1/66* (2013.01); *G06F 3/0608* (2013.01); *G06F 3/0638* (2013.01); *G06F 3/0671* (2013.01); *G06Q 10/02* (2013.01); *G06Q 30/0253* (2013.01); *G06Q 30/0259* (2013.01); *G06Q 30/0261* (2013.01); *G06Q 30/0267* (2013.01); *G06Q 30/0639* (2013.01); *G07C 5/00* (2013.01); *G07C 9/00309* (2013.01); *G07F 15/003* (2013.01); *G07F 15/005* (2013.01); *G07F 15/006* (2013.01); *G07F 17/0042* (2013.01); *G07F 17/12* (2013.01); *H01M 10/425* (2013.01); *H01M 10/4257* (2013.01); *H01M 10/441* (2013.01); *H01M 10/482* (2013.01); *H02J 4/00* (2013.01); *H02J 7/00* (2013.01); *H02J 7/007* (2013.01); *H02J 7/0013* (2013.01); *H02J 7/0021* (2013.01); *H02J 7/0027* (2013.01); *B60L 2200/12* (2013.01); *B60L 2200/24* (2013.01); *B60L 2210/12* (2013.01); *B60L 2210/14* (2013.01); *B60L 2210/30* (2013.01); *B60L 2220/14* (2013.01); *B60L 2220/16* (2013.01); *B60L 2220/46* (2013.01); *B60L 2240/12* (2013.01); *B60L 2240/14* (2013.01); *B60L 2240/26* (2013.01); *B60L 2240/421* (2013.01); *B60L 2240/423* (2013.01); *B60L 2240/427* (2013.01); *B60L 2240/429* (2013.01); *B60L 2240/525* (2013.01); *B60L 2240/545* (2013.01); *B60L 2240/622* (2013.01); *B60L 2240/642* (2013.01); *B60L 2240/645* (2013.01); *B60L 2240/662* (2013.01); *B60L 2240/70* (2013.01); *B60L 2250/10* (2013.01); *B60L 2250/16* (2013.01); *B60L 2250/18* (2013.01); *B60L 2250/20* (2013.01); *B60L 2250/22* (2013.01); *B60L 2260/44* (2013.01); *B60L 2260/52* (2013.01); *B60L 2270/34* (2013.01); *B60L 2270/46* (2013.01); *G05B 2219/15048* (2013.01); *G05B 2219/15053* (2013.01); *G07C*

2009/00769 (2013.01); H01M 2010/4271 (2013.01); H01M 2010/4278 (2013.01); H01M 2220/20 (2013.01); H01M 2220/30 (2013.01); H02J 2007/0001 (2013.01); H02J 2007/0098 (2013.01); Y02E 60/12 (2013.01); Y02E 60/721 (2013.01); Y02T 10/645 (2013.01); Y02T 10/7005 (2013.01); Y02T 10/705 (2013.01); Y02T 10/7011 (2013.01); Y02T 10/7022 (2013.01); Y02T 10/7044 (2013.01); Y02T 10/7055 (2013.01); Y02T 10/7072 (2013.01); Y02T 10/7088 (2013.01); Y02T 10/7094 (2013.01); Y02T 10/7225 (2013.01); Y02T 10/7233 (2013.01); Y02T 10/7241 (2013.01); Y02T 10/7258 (2013.01); Y02T 10/7283 (2013.01); Y02T 10/7291 (2013.01); Y02T 10/92 (2013.01); Y02T 90/121 (2013.01); Y02T 90/124 (2013.01); Y02T 90/127 (2013.01); Y02T 90/128 (2013.01); Y02T 90/14 (2013.01); Y02T 90/16 (2013.01); Y02T 90/161 (2013.01); Y02T 90/162 (2013.01); Y02T 90/163 (2013.01); Y02T 90/168 (2013.01); Y02T 90/169 (2013.01); Y04S 10/126 (2013.01); Y04S 30/12 (2013.01); Y04S 30/14 (2013.01); Y04S 50/10 (2013.01); Y04S 50/14 (2013.01); Y10T 70/7062 (2015.04); Y10T 307/406 (2015.04)

(58) Field of Classification Search
CPC ...... B60L 3/0061; B60L 11/1803; B60L 7/22; B60L 3/0046; B60L 1/14; B60L 11/1857; B60L 7/06; B60L 1/003; B60L 1/02; B60L 7/14; B60L 11/1877; B60L 11/1864; B60L 11/1816; B60L 11/185; B60L 15/2045; B60L 11/1851; B60L 11/1842; B60L 11/1848; B60L 11/1838; B60L 3/003; B60L 11/005; B60L 11/1824; B60L 11/1846; B60L 11/1822; B60L 3/0069; B60L 11/1861; B60L 2270/00; B60L 2200/24; B60L 2260/52; B60L 2240/622; B60L 2220/46; B60L 2240/26; B60L 2240/645; B60L 2240/421; B60L 2240/12; B60L 2240/545; B60L 2240/423; B60L 2250/10; B60L 2240/429; B60L 2260/44; B60L 2240/642; B60L 2250/20; B60L 2240/427; B60L 2240/14; B60L 2220/14; B60L 2250/16; B60L 2250/18; B60L 2240/662; B60L 2270/46; B60L 2220/16; B60L 2240/525; B60L 2250/22; B60L 2270/34; B60L 2230/40; B60L 2240/70; B60L 2210/14; B60L 2210/30; B60L 2210/12; B60L 2230/16; B60L 2200/12; G05F 1/66; G07C 9/00309; G07C 5/0858; G07C 5/00; G07C 2009/00769; E05B 47/0001; E05B 81/86; E05B 81/04; E05B 81/64; E05B 81/56; G05B 19/05; G05B 2219/15048; G05B 2219/15053; H02J 7/0021; H02J 7/0027; H02J 7/0013; H02J 4/00; H02J 7/007; H02J 7/00; H02J 2007/0001; H02J 2007/0098; G01C 21/3682; G01C 21/3476; G06Q 30/0261; G06Q 10/02; G06Q 30/0639; G06Q 30/0267; G06Q 30/0253; G06Q 30/0259; G06F 3/0608; G06F 3/0671; G06F 3/0638; H01M 10/441; H01M 10/482; H01M 10/425; H01M 10/4257; H01M 2010/4271; H01M 2010/4278; H01M 2220/30; H01M 2220/20; Y02T 10/7088; Y02T 10/7283; Y02T 90/162; Y02T 10/645; Y02T 10/7072; Y02T 10/7258; Y02T 90/121; Y02T 10/7291; Y02T 10/7094; Y02T 10/92; Y02T 10/7055; Y02T 90/161; Y02T 10/7225; Y02T 90/168; Y02T 90/169; Y02T 90/127; Y02T 90/163; Y02T 10/7044; Y02T 10/7011; Y02T 90/128; Y02T 90/14; Y02T 10/7233; Y02T 90/124; Y02T 10/705; Y02T 10/7241; Y02T 90/16; Y02T 10/7022; Y02T 10/7005; Y02E 60/721; Y02E 60/12; Y04S 10/126; Y04S 50/14; Y04S 50/10; Y04S 30/12; Y04S 30/14; Y10T 307/406; Y10T 70/7062

See application file for complete search history.

(56) References Cited

U.S. PATENT DOCUMENTS

| | | |
|---|---|---|
| 3,664,450 A | 5/1972 | Udden et al. |
| 3,678,455 A | 7/1972 | Levey |
| 4,087,895 A | 5/1978 | Etienne |
| 4,129,759 A | 12/1978 | Hug |
| 4,216,839 A | 8/1980 | Gould et al. |
| 4,553,127 A * | 11/1985 | Issa ............ B60R 25/045 180/287 |
| 4,669,570 A | 6/1987 | Perret |
| 5,187,423 A | 2/1993 | Marton |
| 5,189,325 A | 2/1993 | Jarczynski |
| 5,236,069 A | 8/1993 | Peng |
| 5,339,250 A | 8/1994 | Durbin |
| 5,349,535 A | 9/1994 | Gupta |
| 5,376,869 A | 12/1994 | Konrad |
| 5,544,784 A | 8/1996 | Malaspina |
| 5,596,261 A | 1/1997 | Suyama |
| 5,627,752 A | 5/1997 | Buck et al. |
| 5,631,536 A | 5/1997 | Tseng |
| 5,642,270 A | 6/1997 | Green et al. |
| 5,744,933 A | 4/1998 | Inoue et al. |
| 5,815,824 A | 9/1998 | Saga et al. |
| 5,839,800 A | 11/1998 | Koga et al. |
| 5,898,282 A | 4/1999 | Drozdz et al. |
| 5,998,963 A | 12/1999 | Aarseth |
| 6,016,882 A | 1/2000 | Ishikawa |
| 6,154,006 A | 11/2000 | Hatanaka et al. |
| 6,177,867 B1 | 1/2001 | Simon et al. |
| 6,177,879 B1 | 1/2001 | Kokubu et al. |
| 6,236,333 B1 | 5/2001 | King |
| 6,403,251 B1 | 6/2002 | Baggaley et al. |
| 6,429,622 B1 | 8/2002 | Svensson |
| 6,498,457 B1 | 12/2002 | Tsuboi |
| 6,515,580 B1 | 2/2003 | Isoda et al. |
| 6,583,592 B2 | 6/2003 | Omata et al. |
| 6,593,713 B2 | 7/2003 | Morimoto et al. |
| 6,796,396 B2 | 9/2004 | Kamen et al. |
| 6,822,560 B2 | 11/2004 | Geber et al. |
| 6,854,773 B2 | 2/2005 | Lin |
| 6,899,268 B2 | 5/2005 | Hara |
| 6,952,795 B2 | 10/2005 | O'Gorman et al. |
| 7,010,682 B2 | 3/2006 | Reinold et al. |
| 7,131,005 B2 | 10/2006 | Levenson et al. |
| 7,392,068 B2 | 6/2008 | Dayan et al. |
| 7,415,332 B2 | 8/2008 | Ito et al. |
| 7,426,910 B2 | 9/2008 | Elwart |
| 7,495,543 B2 | 2/2009 | Denison et al. |
| 7,567,166 B2 | 7/2009 | Bourgine De Meder |
| 7,592,728 B2 | 9/2009 | Jones et al. |
| 7,596,709 B2 | 9/2009 | Cooper et al. |
| 7,617,893 B2 | 11/2009 | Syed et al. |
| 7,698,044 B2 | 4/2010 | Prakash et al. |
| 7,728,548 B2 | 6/2010 | Daynes et al. |
| 7,761,307 B2 | 7/2010 | Ochi et al. |

(56) References Cited

U.S. PATENT DOCUMENTS

| | | |
|---|---|---|
| 7,778,746 B2 | 8/2010 | McLeod et al. |
| 7,863,858 B2 | 1/2011 | Gangstoe et al. |
| 7,868,591 B2 | 1/2011 | Phillips et al. |
| 7,898,439 B2 | 3/2011 | Bettez et al. |
| 7,908,020 B2 | 3/2011 | Pieronek |
| 7,923,144 B2 | 4/2011 | Kohn et al. |
| 7,948,207 B2 | 5/2011 | Scheucher |
| 7,979,147 B1 | 7/2011 | Dunn |
| 7,993,155 B2 | 8/2011 | Heichal et al. |
| 8,006,793 B2 | 8/2011 | Heichal et al. |
| 8,006,973 B2 | 8/2011 | Toba et al. |
| 8,013,571 B2 | 9/2011 | Agassi et al. |
| 8,035,341 B2 | 10/2011 | Genzel et al. |
| 8,035,349 B2 | 10/2011 | Lubawy |
| 8,063,762 B2 | 11/2011 | Sid |
| 8,068,952 B2 | 11/2011 | Valentine et al. |
| 8,106,631 B2 | 1/2012 | Abe |
| 8,118,132 B2 | 2/2012 | Gray, Jr. |
| 8,164,300 B2 | 4/2012 | Agassi et al. |
| 8,219,839 B2 | 7/2012 | Akimoto |
| 8,229,625 B2 | 7/2012 | Lal et al. |
| 8,265,816 B1 * | 9/2012 | LaFrance .............. B60R 25/045 701/22 |
| 8,301,365 B2 | 10/2012 | Niwa et al. |
| 8,319,605 B2 | 11/2012 | Hassan et al. |
| 8,326,259 B2 | 12/2012 | Gautama et al. |
| 8,354,768 B2 | 1/2013 | Cipriani |
| 8,355,965 B2 | 1/2013 | Yamada |
| 8,378,627 B2 | 2/2013 | Asada et al. |
| 8,412,401 B2 | 4/2013 | Bertosa et al. |
| 8,437,908 B2 | 5/2013 | Goff et al. |
| 8,447,598 B2 | 5/2013 | Chutorash et al. |
| 8,614,565 B2 | 12/2013 | Lubawy |
| 8,725,135 B2 | 5/2014 | Weyl et al. |
| 2001/0018903 A1 | 9/2001 | Hirose et al. |
| 2002/0023789 A1 | 2/2002 | Morisawa et al. |
| 2002/0070851 A1 | 6/2002 | Raichle et al. |
| 2003/0141840 A1 | 7/2003 | Sanders |
| 2003/0163434 A1 | 8/2003 | Barends |
| 2003/0209375 A1 | 11/2003 | Suzuki et al. |
| 2004/0236615 A1 | 11/2004 | Msndy |
| 2004/0246119 A1 | 12/2004 | Martin et al. |
| 2006/0047380 A1 | 3/2006 | Welch |
| 2006/0208850 A1 | 9/2006 | Ikeuchi et al. |
| 2006/0284601 A1 | 12/2006 | Salasoo et al. |
| 2007/0026996 A1 | 2/2007 | Ayabe et al. |
| 2007/0035397 A1 | 2/2007 | Patenaude et al. |
| 2007/0069687 A1 | 3/2007 | Suzuki |
| 2007/0090921 A1 | 4/2007 | Fisher |
| 2007/0145945 A1 | 6/2007 | McGinley et al. |
| 2007/0159297 A1 | 7/2007 | Paulk et al. |
| 2007/0208468 A1 | 9/2007 | Sankaran et al. |
| 2008/0012683 A1 | 1/2008 | Ito |
| 2008/0276110 A1 | 11/2008 | Indiani et al. |
| 2009/0024872 A1 | 1/2009 | Beverly |
| 2009/0033456 A1 | 2/2009 | Castillo et al. |
| 2009/0082957 A1 | 3/2009 | Agassi et al. |
| 2009/0112394 A1 | 4/2009 | Lepejian et al. |
| 2009/0158790 A1 | 6/2009 | Oliver |
| 2009/0251300 A1 | 10/2009 | Yasuda et al. |
| 2009/0294188 A1 | 12/2009 | Cole |
| 2010/0026238 A1 | 2/2010 | Suzuki et al. |
| 2010/0051363 A1 | 3/2010 | Inoue et al. |
| 2010/0052588 A1 | 3/2010 | Okamura et al. |
| 2010/0079115 A1 | 4/2010 | Lubawy |
| 2010/0089547 A1 | 4/2010 | King et al. |
| 2010/0094496 A1 * | 4/2010 | Hershkovitz .............. B60L 3/12 701/22 |
| 2010/0114798 A1 | 5/2010 | Sirton |
| 2010/0161481 A1 | 6/2010 | Littrell |
| 2010/0181964 A1 | 7/2010 | Huggins et al. |
| 2010/0198535 A1 | 8/2010 | Brown et al. |
| 2010/0198754 A1 | 8/2010 | Jones et al. |
| 2010/0201482 A1 | 8/2010 | Robertson et al. |
| 2010/0235043 A1 | 9/2010 | Seta et al. |
| 2010/0292877 A1 | 11/2010 | Lee |
| 2010/0308989 A1 | 12/2010 | Gasper |
| 2011/0025267 A1 | 2/2011 | Kamen et al. |
| 2011/0029157 A1 | 2/2011 | Muzaffer |
| 2011/0032110 A1 | 2/2011 | Taguchi |
| 2011/0071932 A1 | 3/2011 | Agassi et al. |
| 2011/0082621 A1 | 4/2011 | Berkobin et al. |
| 2011/0106329 A1 | 5/2011 | Donnelly et al. |
| 2011/0112710 A1 | 5/2011 | Meyer-Ebeling et al. |
| 2011/0114798 A1 | 5/2011 | Gemmati |
| 2011/0120789 A1 | 5/2011 | Teraya |
| 2011/0148346 A1 | 6/2011 | Gagosz et al. |
| 2011/0153141 A1 | 6/2011 | Beechie et al. |
| 2011/0160992 A1 | 6/2011 | Crombez |
| 2011/0169447 A1 | 7/2011 | Brown et al. |
| 2011/0200193 A1 | 8/2011 | Blitz et al. |
| 2011/0202476 A1 | 8/2011 | Nagy et al. |
| 2011/0218703 A1 | 9/2011 | Uchida |
| 2011/0224900 A1 | 9/2011 | Hiruta et al. |
| 2011/0241824 A1 | 10/2011 | Uesugi |
| 2011/0258668 A1 | 10/2011 | Musa et al. |
| 2011/0260691 A1 | 10/2011 | Ishibashi et al. |
| 2011/0270480 A1 | 11/2011 | Ishibashi et al. |
| 2011/0279257 A1 | 11/2011 | Au et al. |
| 2011/0292667 A1 | 12/2011 | Meyers |
| 2011/0295454 A1 | 12/2011 | Meyers |
| 2011/0303509 A1 | 12/2011 | Agassi et al. |
| 2012/0000720 A1 | 1/2012 | Honda et al. |
| 2012/0013182 A1 | 1/2012 | Minegishi et al. |
| 2012/0019196 A1 | 1/2012 | Fung |
| 2012/0038473 A1 | 2/2012 | Fecher |
| 2012/0062361 A1 | 3/2012 | Kosugi |
| 2012/0068817 A1 | 3/2012 | Fisher |
| 2012/0078413 A1 | 3/2012 | Baker, Jr. |
| 2012/0105078 A1 | 5/2012 | Kikuchi et al. |
| 2012/0109519 A1 | 5/2012 | Uyeki |
| 2012/0123661 A1 | 5/2012 | Gray, Jr. |
| 2012/0126969 A1 | 5/2012 | Wilbur et al. |
| 2012/0157083 A1 | 6/2012 | Otterson |
| 2012/0158229 A1 | 6/2012 | Schaefer |
| 2012/0167071 A1 | 6/2012 | Paek |
| 2012/0194346 A1 | 8/2012 | Tsai et al. |
| 2012/0215391 A1 * | 8/2012 | Schaefer .............. G07C 5/0858 701/22 |
| 2012/0223575 A1 | 9/2012 | Hachiya et al. |
| 2012/0248868 A1 | 10/2012 | Mobin et al. |
| 2012/0248869 A1 | 10/2012 | Itagaki et al. |
| 2012/0253567 A1 | 10/2012 | Levy et al. |
| 2012/0256588 A1 | 10/2012 | Hayashi et al. |
| 2012/0259665 A1 | 10/2012 | Pandhi et al. |
| 2012/0271723 A1 | 10/2012 | Penilla et al. |
| 2012/0280573 A1 | 11/2012 | Ohkura et al. |
| 2012/0296512 A1 | 11/2012 | Lee et al. |
| 2012/0299537 A1 | 11/2012 | Kikuchi |
| 2012/0299721 A1 | 11/2012 | Jones |
| 2012/0316671 A1 | 12/2012 | Hammerslag et al. |
| 2013/0024306 A1 | 1/2013 | Shah et al. |
| 2013/0026971 A1 | 1/2013 | Luke et al. |
| 2013/0026972 A1 | 1/2013 | Luke et al. |
| 2013/0026973 A1 | 1/2013 | Luke et al. |
| 2013/0027183 A1 | 1/2013 | Wu et al. |
| 2013/0030580 A1 | 1/2013 | Luke et al. |
| 2013/0030581 A1 | 1/2013 | Luke et al. |
| 2013/0030608 A1 | 1/2013 | Taylor et al. |
| 2013/0030630 A1 | 1/2013 | Luke et al. |
| 2013/0030696 A1 | 1/2013 | Wu et al. |
| 2013/0030920 A1 | 1/2013 | Wu et al. |
| 2013/0031318 A1 | 1/2013 | Chen et al. |
| 2013/0033203 A1 | 2/2013 | Luke et al. |
| 2013/0046457 A1 | 2/2013 | Pettersson |
| 2013/0074411 A1 | 3/2013 | Ferguson et al. |
| 2013/0090795 A1 | 4/2013 | Luke et al. |
| 2013/0093271 A1 | 4/2013 | Luke et al. |
| 2013/0093368 A1 | 4/2013 | Luke et al. |
| 2013/0093384 A1 | 4/2013 | Nyu et al. |
| 2013/0116892 A1 | 5/2013 | Wu et al. |
| 2013/0119898 A1 | 5/2013 | Ohkura |
| 2013/0127416 A1 | 5/2013 | Karner et al. |
| 2013/0132307 A1 | 5/2013 | Phelps et al. |

(56) References Cited

U.S. PATENT DOCUMENTS

| | | | |
|---|---|---|---|
| 2013/0179061 | A1 | 7/2013 | Gadh et al. |
| 2013/0181582 | A1 | 7/2013 | Luke et al. |
| 2013/0200845 | A1 | 8/2013 | Bito |
| 2013/0254097 | A1 | 9/2013 | Marathe et al. |
| 2013/0282254 | A1 | 10/2013 | Dwan et al. |
| 2014/0028089 | A1 | 1/2014 | Luke et al. |
| 2014/0163813 | A1 | 6/2014 | Chen et al. |
| 2014/0368032 | A1 | 12/2014 | Doerndorfer |

FOREIGN PATENT DOCUMENTS

| | | | |
|---|---|---|---|
| CN | 2365357 Y | * | 2/2000 |
| CN | 1650487 | | 8/2005 |
| CN | 201017914 Y | * | 2/2008 |
| CN | 201421868 Y | * | 3/2010 |
| CN | 201515238 | | 6/2010 |
| DE | 4229687 | | 3/1994 |
| DE | 4432539 | | 6/1995 |
| DE | 69927649 | | 5/2006 |
| DE | 69933742 | | 2/2007 |
| DE | 102007032210 | | 4/2010 |
| EP | 693813 | | 1/1996 |
| EP | 1177955 | | 2/2002 |
| EP | 877342 | | 5/2006 |
| EP | 1667306 | | 6/2006 |
| EP | 902521 | | 12/2008 |
| EP | 2101390 | | 9/2009 |
| EP | 2230146 | | 9/2010 |
| EP | 2428939 | | 3/2012 |
| EP | 2157552 | | 7/2012 |
| FR | 2970125 | | 7/2012 |
| GB | 2253379 | | 9/1992 |
| GB | 2298300 | | 8/1996 |
| JP | H05135804 | | 6/1993 |
| JP | H0731008 | | 1/1995 |
| JP | H0736504 | | 7/1995 |
| JP | H09119839 | | 5/1997 |
| JP | H10170293 | | 6/1998 |
| JP | 10224906 A | * | 8/1998 |
| JP | H10307952 | | 11/1998 |
| JP | H1149079 | | 2/1999 |
| JP | H1151681 | | 2/1999 |
| JP | H11176487 | | 7/1999 |
| JP | H11205914 | | 7/1999 |
| JP | 2000-102102 | | 4/2000 |
| JP | 2000-102103 | | 4/2000 |
| JP | 2000-142514 | | 5/2000 |
| JP | 2000-341868 | | 12/2000 |
| JP | 2001-128301 | | 5/2001 |
| JP | 2003-118397 | | 4/2003 |
| JP | 2003-262525 | | 9/2003 |
| JP | 2004-238989 | | 8/2004 |
| JP | 2004-336336 | | 11/2004 |
| JP | 2005-067453 | | 3/2005 |
| JP | 2005323455 | | 11/2005 |
| JP | 2006-121874 | | 5/2006 |
| JP | 2007-35479 | | 2/2007 |
| JP | 2007-060353 | | 3/2007 |
| JP | 2007-273315 | | 10/2007 |
| JP | 2007259600 | | 10/2007 |
| JP | 2008016229 | | 1/2008 |
| JP | 2008-127894 | | 6/2008 |
| JP | 2008-219953 | | 9/2008 |
| JP | 2009022069 | | 1/2009 |
| JP | 2009-512035 | | 3/2009 |
| JP | 2009-171646 | | 7/2009 |
| JP | 2009-171647 | | 7/2009 |
| JP | 2009-526344 | | 7/2009 |
| JP | 4319289 | | 8/2009 |
| JP | 2009248888 | | 10/2009 |
| JP | 2010-022148 | | 1/2010 |
| JP | 2010-081722 | | 4/2010 |
| JP | 2010124634 | | 6/2010 |
| JP | 2010-191636 | | 9/2010 |
| JP | 2010-200405 | | 9/2010 |
| JP | 2010-213555 | | 9/2010 |
| JP | 2010225528 | | 10/2010 |
| JP | 2010259238 | | 11/2010 |
| JP | 2010-269686 | | 12/2010 |
| JP | 2010-540907 | | 12/2010 |
| JP | 2011-126452 | | 6/2011 |
| JP | 2011-131631 | | 7/2011 |
| JP | 2011-131805 | | 7/2011 |
| JP | 2011-142704 | | 7/2011 |
| JP | 2011-233470 | | 11/2011 |
| JP | 2012-151916 | | 8/2012 |
| JP | 2012214060 | | 11/2012 |
| KR | 1998-045020 | | 9/1998 |
| KR | 2004-0005146 | | 1/2004 |
| KR | 2010-0012401 | | 2/2010 |
| KR | 10-0971278 | | 7/2010 |
| KR | 2011-0004292 | | 1/2011 |
| KR | 2011-0041783 | | 4/2011 |
| KR | 2012-0020554 | | 3/2012 |
| TW | I228464 | | 3/2005 |
| TW | 200806514 | | 2/2008 |
| TW | 200836452 | | 9/2008 |
| TW | I315116 | | 9/2009 |
| TW | M371880 | | 1/2010 |
| TW | M379269 | | 4/2010 |
| TW | M379789 | | 5/2010 |
| TW | M385047 | | 7/2010 |
| TW | 201043986 | | 12/2010 |
| TW | 201044266 | | 12/2010 |
| WO | 98/21132 | | 5/1998 |
| WO | 99/03186 | | 1/1999 |
| WO | 2009/039454 | | 3/2009 |
| WO | 2010/033517 | | 3/2010 |
| WO | 2010/033881 | | 3/2010 |
| WO | 2010/067006 | | 6/2010 |
| WO | 2010/143483 | | 12/2010 |
| WO | 2011/062004 | | 5/2011 |
| WO | 2011/077214 | | 6/2011 |
| WO | 2011/138205 | | 11/2011 |
| WO | 2012/085992 | | 6/2012 |
| WO | 2012/160407 | | 11/2012 |
| WO | 2012/160557 | | 11/2012 |
| WO | 2013/024483 | | 2/2013 |
| WO | 2013/024484 | | 2/2013 |
| WO | 2013/042216 | | 3/2013 |
| WO | 2013/074819 | | 5/2013 |
| WO | 2013/080211 | | 6/2013 |
| WO | 2013/102894 | | 7/2013 |
| WO | 2013/108246 | | 7/2013 |
| WO | 2013/118113 | | 8/2013 |
| WO | 2013/128007 | | 9/2013 |
| WO | 2013/128009 | | 9/2013 |
| WO | 2013/131548 | | 9/2013 |
| WO | 2013/142154 | | 9/2013 |
| WO | 2013/144951 | | 10/2013 |

OTHER PUBLICATIONS

"Outrunner," retrieved from http://en.wikipedia.org/w/index.php?title=Outrunner&printable=yes on Sep. 16, 2011, 2 pages.

Chen et al., "Apparatus, System, and Method for Authentication of Vehicular Components," U.S. Appl. No. 13/918,703, filed Jun. 14, 2013, 84 pages.

Chen et al., "Apparatus, System, and Method for Authentication of Vehicular Components," U.S. Appl. No. 61/783,041, filed Mar. 14, 2013, 84 pages.

Chen et al., "Apparatus, System, and Method for Authentication of Vehicular Components," Office Action dated Nov. 22, 2013, for U.S. Appl. No. 13/918,703, 35 pages.

Chen et al., "Adjusting Electric Vehicle Systems Based on an Electrical Energy Storage Device Thermal Profile," U.S. Appl. No. 61/862,854, filed Aug. 6, 2013, 74 pages.

Chen et al., "Apparatus, Method and Article for Providing Vehicle Diagnostic Data," U.S. Appl. No. 14/022,134, filed Sep. 9, 2013, 61 pages.

Chen et al., "Apparatus, Method and Article for Providing Vehicle Diagnostic Data," Office Action dated Dec. 30, 2013, for U.S. Appl. No. 14/022,134, 20 pages.

(56) References Cited

OTHER PUBLICATIONS

Chen et al., "Apparatus, Method and Article for Providing Vehicle Diagnostic Data," U.S. Appl. No. 61/601,404, filed Feb. 21, 2012, 56 pages.
Chen et al., "Apparatus, Method and Article for Providing Vehicle Diagnostic Data," Office Action dated Apr. 9, 2014, for U.S. Appl. No. 14/022,134, 20 pages.
Chen et al., "Apparatus, Method and Article for Providing Vehicle Diagnostic Data," Notice of Allowance dated Jul. 9, 2014, for U.S. Appl. No. 14/022,134, 10 pages.
Chen et al., "Apparatus, Method and Article for Providing Vehicle Diagnostic Data," Office Action dated Jun. 18, 2014, for U.S. Appl. No. 13/559,390, 16 pages.
Chen et al., "Apparatus, Method and Article for Providing Vehicle Diagnostic Data," Notice of Allowance dated Nov. 3, 2014, for U.S. Appl. No. 13/559,390, 10 pages.
Chen et al., "Apparatus, System, and Method for Authentication of Vehicular Components," Notice of Allowance dated Mar. 25, 2014, for U.S. Appl. No. 13/918,703, 18 pages.
Chen et al., "Systems and Methods for Powering Electric Vehicles Using a Single or Multiple Power Cells," U.S. Appl. No. 61/862,852, filed Aug. 6, 2013, 46 pages.
Chen et al., "Systems and Methods for Powering Electric Vehicles Using a Single of Multiple Power Cells," U.S. Appl. No. 14/453,156, filed Aug. 6, 2014, 46 pages.
Chinese Office Action dated Oct. 10, 2015, for corresponding CN Application No. 201280046969.1, 13 pages.
Chinese Office Action dated Oct. 27, 2015, for corresponding CN Application No. 201280046983.1, with English Translation, 29 pages.
Communication pursuant to Rules 161(2) and 162 EPC, for corresponding European Patent Application No. 12817273.1, dated Mar. 25, 2014, 3 pages.
Communication pursuant to Rules 161(2) and 162 EPC, for corresponding European Patent Application No. 12817141.0, dated Mar. 26, 2014, 3 pages.
Communication pursuant to Rules 161(2) and 162 EPC, for corresponding European Patent Application No. 12818308.4, dated Mar. 26, 2014, 3 pages.
Communication pursuant to Rules 161(2) and 162 EPC, for corresponding European Patent Application No. 12817696.3, dated Mar. 27, 2014, 3 pages.
Communication pursuant to Rules 161(2) and 162 EPC, for corresponding European Patent Application No. 12817883.7, dated Mar. 27, 2014, 3 pages.
Communication pursuant to Rules 161(2) and 162 EPC, for corresponding European Patent Application No. 12818447.0, dated Mar. 27, 2014, 3 pages.
Extended European Search Report dated Apr. 24, 2015, for corresponding EP Application No. 12817097.4, 9 pages.
Extended European Search Report dated Dec. 4, 2015 for corresponding EP Application No. 12817273.1-1807, 13 pages.
Huang et al., "Apparatus, Method and Article for Vehicle Turn Signals," U.S. Appl. No. 61/727,403, filed Nov. 16, 2012, 41 pages.
Huang et al., "Apparatus, Method and Article for Vehicle Turn Signals," U.S. Appl. No. 14/079,894, filed Nov. 14, 2013, 41 pages.
International Preliminary Report on Patentability and Written Opinion for corresponding International Patent Application No. PCT/US2012/048349, dated Jan. 28, 2014, 5 pages.
International Preliminary Report on Patentability and Written Opinion for corresponding International Patent Application No. PCT/US2012/048354, dated Jan. 28, 2014, 7 pages.
International Preliminary Report on Patentability and Written Opinion for corresponding International Patent Application No. PCT/US2012/048358, dated Jan. 28, 2014, 5 pages.
International Preliminary Report on Patentability and Written Opinion for corresponding International Patent Application No. PCT/US2012/048366, dated Jan. 28, 2014, 5 pages.
International Preliminary Report on Patentability and Written Opinion for corresponding International Patent Application No. PCT/US2012/048367, dated Jan. 28, 2014, 4 pages.
International Preliminary Report on Patentability and Written Opinion for corresponding International Patent Application No. PCT/US2012/048375, dated Jan. 28, 2014, 5 pages.
International Preliminary Report on Patentability and Written Opinion for corresponding International Patent Application No. PCT/US2012/048379, dated Jan. 28, 2014, 5 pages.
International Preliminary Report on Patentability and Written Opinion for corresponding International Patent Application No. PCT/US2012/048380, dated Jan. 28, 2014, 5 pages.
International Preliminary Report on Patentability and Written Opinion for corresponding International Patent Application No. PCT/US2012/048382, dated Jan. 28, 2014, 5 pages.
International Preliminary Report on Patentability and Written Opinion for corresponding International Patent Application No. PCT/US2012/048391, dated Jan. 28, 2014, 6 pages.
International Preliminary Report on Patentability dated Sep. 8, 2015, for corresponding International Application No. PCT/US2014/021369, 9 pages.
International Search Report and Written Opinion for corresponding European Patent Application No. PCT/US2012/048379, dated Dec. 17, 2012, 9 pages.
International Search Report and Written Opinion for corresponding International Patent Application No. PCT/US2012/048380, dated Feb. 27, 2013, 9 pages.
International Search Report and Written Opinion for corresponding International Patent Application No. PCT/US2012/048382, dated Feb. 27, 2013, 9 pages.
International Search Report and Written Opinion for corresponding International Patent Application No. PCT/US2012/063979, dated Mar. 4, 2013, 10 pages.
International Search Report and Written Opinion for corresponding International Patent Application No. PCT/US2012/048347, dated Dec. 18, 2012, 8 pages.
International Search Report and Written Opinion for corresponding International Patent Application No. PCT/US2012/048349, dated Feb. 18, 2013, 9 pages.
International Search Report and Written Opinion for corresponding International Patent Application No. PCT/US2012/048354, dated Feb. 18, 2013, 11 pages.
International Search Report and Written Opinion for corresponding International Patent Application No. PCT/US2012/048358, dated Feb. 25, 2013, 9 pages.
International Search Report and Written Opinion for corresponding International Patent Application No. PCT/US2012/048366, dated Jan. 21, 2013, 10 pages.
International Search Report and Written Opinion for corresponding International Patent Application No. PCT/US2012/048367, dated Jan. 17, 2013, 8 pages.
International Search Report and Written Opinion for corresponding International Patent Application No. PCT/US2012/048375, dated Jan. 23, 2013, 9 pages.
International Search Report and Written Opinion for corresponding International Application No. PCT/US2012/048391, dated Dec. 21, 2012, 9 pages.
International Search Report and Written Opinion for corresponding International Application No. PCT/US2013/070131, dated Feb. 19, 2014, 17 pages.
International Search Report and Written Opinion for corresponding International Patent Application No. PCT/US2012/048344, dated Feb. 28, 2013, 9 pages.
International Search Report and Written Opinion for corresponding International Application No. PCT/US2012/058930, dated Mar. 15, 2013, 11 pages.
International Search Report and Written Opinion for corresponding International Application No. PCT/US2012/059931, dated Mar. 29, 2013, 13 pages.
International Search Report and Written Opinion for corresponding International Application No. PCT/US2014/024757, dated Jul. 11, 2014, 15 pages.

(56) References Cited

OTHER PUBLICATIONS

International Search Report and Written Opinion for corresponding International Application No. PCT/US2013/065704, dated Feb. 13, 2014, 13 pages.
International Search Report and Written Opinion for corresponding International Application No. PCT/US2014/023539, dated Sep. 4, 2014, 12 pages.
International Search Report and Written Opinion for corresponding International Application No. PCT/US2014/050001, dated Nov. 18, 2014, 9 pages.
International Search Report and Written Opinion, for corresponding International Application No. PCT/US2014/021369, dated Jul. 2, 2014, 14 pages.
International Search Report and Written Opinion, for corresponding International Application No. PCT/US2014/022610, dated Jul. 10, 2014, 12 pages.
Japanese Office Action with English Translation dated Oct. 20, 2015 for Corresponding JP Application No. 2014-523010, 36 pages.
Japanese Office Action with English Translation, dated Dec. 16, 2014, for corresponding JP Application No. 2014-523013, 11 pages.
Linke, "Secure access key control through challenge & response," Mar. 15, 2011, retrieved on Dec. 11, 2015 from http://www.embedded.com/design/safety-and-security/4214039/Secure-access--key-control-through-challenge---response, 5 pages.
Luke et al., "Apparatus, Method and Article for Authentication, Security and Control of Portable Charging Devices and Power Storage Devices, Such as Batteries," U.S. Appl. No. 14/017,090, filed Sep. 3, 2013, 69 pages.
Luke et al., "Apparatus, Method and Article for Authentication, Security and Control of Portable Charging Devices and Power Storage Devices, Such as Batteries," U.S. Appl. No. 61/773,621, filed Mar. 6, 2013, 69 pages.
Luke et al., "Apparatus, Method and Article for Authentication, Security and Control of Portable Charging Devices and Power Storage Devices, Such as Batteries," Office Action dated Jan. 6, 2014, for U.S. Appl. No. 14/017,090, 19 pages.
Luke et al., "Apparatus, Method and Article for Authentication, Security and Control of Power Storage Devices, Such as Batteries," Notice of Allowance dated Aug. 3, 2015, for U.S. Appl. No. 13/559,038, 13 pages.
Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.
Luke et al., "Detectible Indication of an Electric Motor Vehicle Standby Mode," U.S. Appl. No. 61/543,720, filed Oct. 5, 2011, 35 pages.
Luke et al., "Detectible Indication of an Electric Motor Vehicle Standby Mode," U.S. Appl. No. 61/684,432, filed Aug. 17, 2012, 41 pages.
Luke et al., "Detectible Indication of an Electric Motor Vehicle Standby Mode," Office Action for U.S. Appl. No. 13/646,320, dated May 30, 2013, 13 pages.
Luke et al., "Drive Assembly for Electric Powered Device," U.S. Appl. No. 61/546,411, filed Oct. 12, 2011, 18 pages.
Luke et al., "Electric Device Drive Assembly and Cooling System," U.S. Appl. No. 61/615,144, filed Mar. 23, 2012, 43 pages.
Luke et al., "Modular System for Collection and Distribution of Electric Storage Devices," U.S. Appl. No. 14/202,589, filed Mar. 10, 2014, 76 pages.
Luke et al., "Modular System for Collection and Distribution of Electric Storage Devices," U.S. Appl. No. 61/789,065, filed Mar. 15, 2013, 76 pages.
Luke et al., "Apparatus, Method and Article for Authentication, Security and Control of Power Storage Devices, Such as Batteries," U.S. Appl. No. 61/534,761, filed Sep. 14, 2011, 55 pages.
Luke et al., "Apparatus, Method and Article for Authentication, Security and Control of Power Storage Devices, Such as Batteries," Office Action dated Feb. 26, 2014, for U.S. Appl. No. 13/559,038, 13 pages.
Luke et al., "Apparatus, Method and Article for Authentication, Security and Control of Power Storage Devices, Such as Batteries, Based on User Profiles," U.S. Appl. No. 61/534,772, filed Sep. 14, 2011, 55 pages.
Luke et al., "Apparatus, Method and Article for Authentication, Security and Control of Power Storage Devices, Such as Batteries," Office Action dated Feb. 25, 2014, for U.S. Appl. No. 14/023,344, 12 pages.
Luke et al., "Apparatus, Method and Article for Authentication, Security and Control of Portable Charging Devices and Power Storage Devices, Such as Batteries," Office Action dated Jun. 26, 2014, for U.S. Appl. No. 14/017,090, 19 pages.
Luke et al., "Apparatus, Method and Article for Authentication, Security and Control of Power Storage Devices, Such as Batteries," Office Action dated Aug. 19, 2014, for U.S. Appl. No. 13/559,038, 14 pages.
Luke et al., "Apparatus, Method and Article for Authentication, Security and Control of Power Storage Devices, Such as Batteries," Office Action dated Aug. 21, 2014, for U.S. Appl. No. 14/023,344, 13 pages.
Luke et al., "Apparatus, Method and Article for Authentication, Security and Control of Power Storage Devices, Such as Batteries," Office Action dated Jun. 19, 2015, for U.S. Appl. No. 14/023,344, 9 pages.
Luke et al., "Apparatus, Method and Article for Collection, Charging and Distributing Power Storage Devices, Such as Batteries," U.S. Appl. No. 61/511,900, filed Jul. 26, 2011, 73 pages.
Luke et al., "Apparatus, Method and Article for Collection, Charging and Distributing Power Storage Devices, Such as Batteries," U.S. Appl. No. 61/647,936, filed May 16, 2012, 76 pages.
Luke et al., "Apparatus, Method and Article for Redistributing Power Storage Devices, Such as Batteries, Between Collection, Charging and Distribution Machines," U.S. Appl. No. 61/534,753, filed Sep. 14, 2011, 65 pages.
Luke et al., "Detectible Indication of an Electric Motor Vehicle Standby Mode," Notice of Allowance dated Apr. 10, 2014, for U.S. Appl. No. 13/646,320, 8 pages.
Luke et al., "Dynamically Limiting Vehicle Operation for Best Effort Economy," U.S. Appl. No. 61/511,880, filed Jul. 26, 2011, 52 pages.
Luke et al., "Dynamically Limiting Vehicle Operation for Best Effort Economy," Office Action for U.S. Appl. No. 13/559,264, dated Aug. 14, 2013, 21 pages.
Luke et al., "Dynamically Limiting Vehicle Operation for Best Effort Economy," Office Action for U.S. Appl. No. 13/559,264, dated Feb. 12, 2014, 24 pages.
Luke et al., "Dynamically Limiting Vehicle Operation for Best Effort Economy," Office Action for U.S. Appl. No. 13/559,264, dated Aug. 19, 2014, 26 pages.
Luke et al., "Dynamically Limiting Vehicle Operation for Best Effort Economy," Office Action for U.S. Appl. No. 13/559,264, dated Jan. 21, 2015, 31 pages.
Luke et al., "Portable Electrical Energy Storage Device," U.S. Appl. No. 61/872,126, filed Aug. 30, 2013, 39 pages.
Luke et al., "Thermal Management of Components in Electric Motor Drive Vehicles," U.S. Appl. No. 61/647,941, filed May 16, 2012, 47 pages.
Luke et al., "Thermal Management of Components in Electric Motor Drive Vehicles," U.S. Appl. No. 61/511,887, filed Jul. 26, 2011, 44 pages.
Luke et al., "Thermal Management of Components in Electric Motor Drive Vehicles," Office Action dated Apr. 2, 2014, for U.S. Appl. No. 13/559,259, 11 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle via a Mobile Device," U.S. Appl. No. 14/017,081, filed Sep. 3, 2013, 81 pages.
Luke, "Apparatus, Method and Article for Providing Information Regarding a Vehicle via a Mobile Device," Office Action for U.S. Appl. No. 14/017,081, dated Jan. 30, 2014, 36 pages.

(56) References Cited

OTHER PUBLICATIONS

Luke, "Apparatus, Method and Article for Providing Information Regarding a Vehicle via a Mobile Device," U.S. Appl. No. 61/780,781, filed Mar. 13, 2013, 80 pages.
Luke, "Apparatus, Method and Article for Providing Information Regarding a Vehicle via a Mobile Device," Office Action for U.S. Appl. No. 14/017,081, dated Jul. 21, 2014, 42 pages.
Luke, "Apparatus, Method and Article for Providing Information Regarding a Vehicle via a Mobile Device," Office Action for U.S. Appl. No. 14/017,081, dated Dec. 31, 2014, 59 pages.
Luke, "Apparatus, Method and Article for Changing Portable Electrical Power Storage Device Exchange Plans," U.S. Appl. No. 14/204,587, filed Mar. 11, 2014, 56 pages.
Microchip, "AN885: Brushless DC (BLDC) Motor Fundamentals," Microchip Technology Inc., 2003, 19 pages.
Partial Supplementary European Search Report dated Nov. 4, 2015 for corresponding EP Application 12818308.4-1807, 7 pages.
Taylor et al., "Apparatus, Method and Article for Physical Security of Power Storage Devices in Vehicles," U.S. Appl. No. 61/557,170, filed Nov. 8, 2011, 60 pages.
Taylor et al., "Apparatus, Method and Article for Physical Security of Power Storage Devices in Vehicles," Notice of Allowance for U.S. Appl. No. 13/559,054, dated May 30, 2013, 32 pages.
Taylor et al., "Apparatus, Method and Article for Physical Security of Power Storage Devices in Vehicles," Office Action for U.S. Appl. No. 13/559,054, dated Dec. 3, 2012, 11 pages.
Wu et al., "Battery Configuration for an Electric Vehicle," U.S. Appl. No. 61/716,388, filed Oct. 19, 2012, 37 pages.
Wu et al., "Apparatus, Method and Article for a Power Storage Device Compartment," U.S. Appl. No. 61/581,566, filed Dec. 29, 2011, 61 pages.
Wu et al., "Apparatus, Method and Article for a Power Storage Device Compartment," Office Action for U.S. Appl. No. 13/559,125, dated Feb. 24, 2014, 28 pages.
Wu et al., "Apparatus, Method and Article for a Power Storage Device Compartment," Office Action for U.S. Appl. No. 13/559,125, dated Sep. 9, 2014, 28 pages.
Wu et al., "Apparatus, Method and Article for a Power Storage Device Compartment," Office Action for U.S. Appl. No. 13/559,125, dated Jun. 16, 2015, 30 pages.
Wu et al., "Apparatus, Method and Article for Power Storage Device Failure Safety," U.S. Appl. No. 14/071,134, filed Nov. 4, 2013, 68 pages.
Wu et al., "Apparatus, Method and Article for Power Storage Device Failure Safety," Office Action for U.S. Appl. No. 14/071,134, dated Feb. 12, 2014, 14 pages.
Wu et al., "Apparatus, Method and Article for Power Storage Device Failure Safety," Office Action dated Jun. 9, 2014, for U.S. Appl. No. 14/071,134, 15 pages.
Wu et al., "Apparatus, Method and Article for Providing Information Regarding Availability of Power Storage Devices at a Power Storage Device Collection, Charging and Distribution Machine," U.S. Appl. No. 61/601,953, filed Feb. 22, 2012, 53 pages.
Wu et al., "Apparatus, Method and Article for Providing Information Regarding Availability of Power Storage Devices at a Power Storage Device Collection, Charging and Distribution Machine," U.S. Appl. No. 14/022,140, filed Sep. 9, 2013, 56 pages.
Wu et al., "Apparatus, Method and Article for Providing Information Regarding Availability of Power Storage Devices at a Power Storage Device Collection, Charging and Distribution Machine," Office Action dated Mar. 5, 2014, for U.S. Appl. No. 14/022,140, 8 pages.
Wu et al., "Apparatus, Method and Article for Providing Locations of Power Storage Device Collection, Charging and Distribution Machines," U.S. Appl. No. 61/601,949, filed Feb. 22, 2012, 56 pages.
Wu et al., "Apparatus, Method and Article for Providing Locations of Power Storage Device Collection, Charging and Distribution Machines," Office Action for U.S. Appl. No. 13/559,333, dated Jul. 3, 2013, 14 pages.
Wu et al., "Apparatus, Method and Article for Providing Locations of Power Storage Device Collection, Charging and Distribution Machines," U.S. Appl. No. 14/022,147, filed Sep. 9, 2013, 56 pages.
Wu et al., "Apparatus, Method and Article for Providing Locations of Power Storage Device Collection, Charging and Distribution Machines," Office Action dated Nov. 19, 2013, for U.S. Appl. No. 14/022,147, 10 pages.
Wu et al., "Apparatus, Method and Article for Providing Locations of Power Storage Device Collection, Charging and Distribution Machines," Office Action dated Mar. 5, 2014, for U.S. Appl. No. 14/022,147, 12 pages.
Wu et al., "Apparatus, Method and Article for Providing Locations of Power Storage Device Collection, Charging and Distribution Machines," Office Action dated Nov. 27, 2013, for U.S. Appl. No. 13/559,333, 19 pages.
Wu et al., "Apparatus, Method and Article for Providing Locations of Power Storage Device Collection, Charging and Distribution Machines," Notice of Allowance dated Jul. 10, 2014, for U.S. Appl. No. 13/559,333, 9 pages.
Wu et al., "Apparatus, Method and Article for Providing Locations of Power Storage Device Collection, Charging and Distribution Machines," Office Action dated Aug. 6, 2014, for U.S. Appl. No. 14/022,147, 17 pages.
Wu et al., "Apparatus, Method and Article for Providing Locations of Power Storage Device Collection, Charging and Distribution Machines," Notice of Allowance dated Nov. 25, 2014, for U.S. Appl. No. 14/022,147, 5 pages.
Wu et al., "Apparatus, Method and Article for Providing to a User Device Information Regarding Availability of Portable Electrical Energy Storage Devices at a Portable Electrical Energy Storage Device Collection, Charging and Distribution Machine," Notice of Allowance dated Jun. 30, 2014, for U.S. Appl. No. 14/022,140, 5 pages.
Wu et al., "Apparatus, Method and Article for Providing to a User Device Information Regarding Availability of Portable Electrical Energy Storage Devices at a Portable Electrical Storage Device Collection, Charging and Distribution Machine," U.S. Appl. No. 14/511,137, dated Oct. 9, 2014, 56 pages.
Wu et al., "Apparatus, Method and Article for Security of Vehicles," U.S. Appl. No. 61/557,176, filed Nov. 8, 2011, 37 pages.
Wu et al., "Apparatus, Method and Article for Security of Vehicles," Office Action dated Oct. 2, 2014, for U.S. Appl. No. 13/671,144, 20 pages.
Wu, "Battery Configuration for an Electric Vehicle," U.S. Appl. No. 14/057,405, filed Oct. 18, 2013, 38 pages.
Extended European Search Report dated Oct. 27, 2016 for corresponding EP Application No. 14761038.0, 9 pages.
Li et al., "Electric Vehicles Network with Nomadic Portable Charging Stations," 72nd IEEE Vehicular Technology Conference, Ottawa, Canada, Sep. 6-9, 2010, 5 pages.
"Rollingcode", retrieved from https://de.wikipedia.org/wiki/Rollingcode on Sep. 9, 2015, with English translation, 2 pages.
Extended European Search Report dated Feb. 17, 2016 for corresponding EP Application 12818308.4-1807, 14 pages.
Japanese Office Action dated Jul. 12, 2016, for corresponding JP Application No. 2014-523010, with English Translation, 9 pages.
Taiwanese Office Action with English Translation dated Jun. 21, 2016, for corresponding TW Application No. 101127030, 14 pages.
Japanese Office Action dated May 10, 2016, for corresponding JP Application No. 2014-523017, with English Translation, 5 pages.
Taiwanese Office Action dated Mar. 28, 2016 for corresponding TW Application No. 104106463, with English Translation, 16 pages.
Intellectual Property Office of India, IN Application No. 1347/DELNP/2014, Examination Report dated Aug. 28, 2018, 5 pages.

\* cited by examiner

APPARATUS, METHOD AND ARTICLE FOR PHYSICAL SECURITY OF POWER STORAGE DEVICES IN VEHICLES

CROSS REFERENCE TO RELATED APPLICATIONS

This application is a continuation of U.S. application Ser. No. 15/011,053, filed Jan. 29, 2016, (U.S. Pat. No. 9,908, 506), which is a continuation of U.S. application Ser. No. 14/012,845, filed Aug. 28, 2013 (U.S. Pat. No. 9,275,505), which is a continuation of U.S. application Ser. No. 13/559, 054, filed Jul. 26, 2012 (U.S. Pat. No. 8,560,147), which claims priority to U.S. Application No. 61/647,941, filed May 16, 2012, U.S. Application No. 61/647,936, filed May 16, 2012, U.S. Application No. 61/601,953, filed Feb. 22, 2012, U.S. Application No. 61/601,949, filed Feb. 22, 2012, U.S. Application No. 61/601,404, filed Feb. 21, 2012, U.S. Application No. 61/581,566, filed Dec. 29, 2011, U.S. Application No. 61/557,170, filed Nov. 8, 2011, U.S. Application No. 61/534,772, filed Sep. 14, 2011, U.S. Application No. 61/534,761, filed Sep. 14, 2011, U.S. Application No. 61/534,734, filed Sep. 14, 2011, U.S. Application No. 61/511,900, filed Jul. 26, 2011, U.S. Application No. 61/511, 887, filed Jul. 26, 2011, and U.S. Application No. 61/511, 880, filed Jul. 26, 2011, all of which are incorporated by reference herein in their entireties.

BACKGROUND

Technical Field

The present disclosure generally relates to the physical security of power storage devices, and particularly to the physical security of power storage devices in vehicles.

Description of the Related Art

There are a wide variety of uses or applications for portable electrical power storage devices.

One such application is in the field of transportation. Hybrid and all-electric vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all-electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example in the many large cities of Asia. Such scooters and/or motorbikes tend to be relatively inexpensive, particular as compared to automobiles, cars or trucks. Cities with high numbers of combustion engine scooters and/or motorbikes also tend to be very densely populated and suffer from high levels of air pollution. When new, many combustion engine scooters and/or motorbikes are equipped with a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., various reports tie air pollution to emphysema, asthma, pneumonia, cystic fibrosis as well as various cardiovascular diseases). Such diseases take large numbers of lives and severely reduce the quality of life of countless others.

BRIEF SUMMARY

A portable electrical energy storage device security system for a portable electrical energy storage device may be summarized as including at least one controller; and at least one communications module coupled to the at least one controller, wherein the at least one controller is configured to: receive information regarding authentication of an external device via the communications module; and in response to receiving the information regarding authentication, unlock a portable electrical energy storage device locking mechanism to allow the portable electrical energy storage device to be removed from being operably connected to a vehicle.

The at least one controller may be configured to make a determination regarding unlocking the portable electrical energy storage device locking mechanism based on the received information regarding authentication. The least one controller may be further configured to: generate a challenge key to send to the external device; send the challenge key to the external device; receive a response from the external device to the sending of the challenge key, the response including a response code as part of the information regarding authentication; generate an output from a secret algorithm using a secret key and the response code as input, the secret algorithm and the secret key configured to be known only to the portable electrical energy storage device security system and one or more authorized external devices; and comparing the output from the secret algorithm to the response code, and wherein the at least one controller is configured to make the determination regarding unlocking the portable electrical energy storage device locking mechanism based at least on the comparison. The configured portable electrical energy storage device security system may be coupled to the vehicle or may be integrated as part of the portable electrical energy storage device. The external device may be a portable electrical energy storage device collection and charging machine. The external device may be a device located at a vehicle service center. The at least one communications module may be configured to receive the information regarding authentication of the external device via a wireless signal and communicate the information to the at least one controller to unlock the portable electrical energy storage device locking mechanism in order to allow the portable electrical energy storage device to be removed from being operably connected to the vehicle. The portable electrical energy storage device security system may further include the portable electrical energy storage device locking mechanism coupled to the at least one controller; and a switch coupled to the portable electrical energy storage device locking mechanism and the at least one controller, the switch configured to be activated by a control signal generated by the at least one controller of the configured portable electrical energy storage device security system, wherein the controller is configured to: send the signal in a manner to unlock the portable electrical energy storage device locking mechanism in order to allow the portable electrical energy storage device to be removed from being operably connected to the vehicle, if the external device is authenticated based on the information regarding authentication; and send the signal in a manner to lock the portable electrical energy storage device locking mechanism in order to prevent the portable electrical energy storage device from being removed from being operably connected to the vehicle, if, after a defined period of time, the information regarding authentication of the external device can no longer be received via the communications module. The at least one controller may be configured to receive the information regarding authentication via a wireless signal transmitted from the external device. In some embodiments, the wireless signal transmitted from the external device is not detectable outside a specified maximum range from the portable electrical energy storage device security system communications module. The wireless signal may include a rolling code for the authentication of the external device by the at least one controller. The portable electrical energy storage device security system may further include a power interface coupled to the at least one controller and configured to be coupled to the portable electrical energy storage device and the electrical energy storage device locking mechanism to provide power to the electrical energy storage device locking mechanism. The power interface may be configured to be coupled to an auxiliary power source other than the portable electrical energy storage device to provide power to the electrical energy storage device locking mechanism should the portable electrical energy storage device be not able to provide enough power to operate the electrical energy storage device locking mechanism.

A method of operating a portable electrical energy storage device security system may be summarized as including receiving, by the portable electrical energy storage device security system, information regarding authentication of an external device; and making a determination, by the portable electrical energy storage device security system, regarding unlocking a portable electrical energy storage device locking mechanism to allow a portable electrical energy storage device to be removed from being operably connected to a vehicle, based on the information regarding authentication.

The receiving the information may include receiving the information regarding authentication via a wireless signal transmitted from a portable electrical energy storage device collection, charging and distribution machine, and wherein the wireless signal received from the collection, charging and distribution machine may not be detectable outside a specified maximum range from a communications module of the portable electrical energy storage device security system. The method may further include sending a signal from a controller of the portable electrical energy storage device security system in a manner to unlock the portable electrical energy storage device locking mechanism in order to allow the portable electrical energy storage device to be removed from being operably connected to the vehicle, if the external device is authenticated based on the information regarding authentication; and sending a signal from the controller of the portable electrical energy storage device security system in a manner to lock the portable electrical energy storage device locking mechanism in order to prevent the portable electrical energy storage device from being removed from being operably connected to the vehicle, if, after a defined period of time, the information regarding authentication of the external device can no longer continue to be received via a communications module of the portable electrical energy storage device. The portable electrical energy storage device security system may be integrated as part of the portable electrical energy storage device. The portable electrical energy storage device security system may be coupled to the vehicle. The making the determination may include comparing a code from the received information regarding authentication to one or more codes associated with the portable electrical energy storage device security system and may further include unlocking the portable electrical energy storage device locking mechanism to allow the portable electrical energy storage device to be removed from being operably connected to the vehicle if the code from the received information regarding authentication matches one of the one or more codes associated with the portable electrical energy storage device; and locking the portable electrical energy storage device locking mechanism in order to prevent the portable electrical energy storage device from being removed from being operably connected to the vehicle, if, after a defined period of time, the information regarding authentication of the external device can no longer be received via a communications module of the portable electrical energy storage device or if, after a defined period of time, a code from the received information can no longer be matched to at least one or one of one or more codes currently associated with the portable electrical energy storage device security system. The method may further include generating a challenge key to send to the external device; sending the challenge key to the external device; receiving a response from the external device to the sending of the challenge key, the response including a response code as part of the information regarding authentication; generating an output from a secret algorithm using a secret key and the response code as input, the secret algorithm and the secret key configured to be known only to the portable electrical energy storage device security system and one or more authorized external devices; and comparing the output from the secret algorithm to the response code, and wherein making the determination regarding unlocking the portable electrical energy storage device locking mechanism is based at least on the comparison.

A portable electrical energy storage device may be summarized as including a battery cell; and a security system operably coupled to the cell, the security system configured to allow the portable electrical energy storage device to be removed from being operably connected to a vehicle, based on information received wirelessly regarding authentication of an external device.

The security system may include at least one controller; and at least one communications module coupled to the at least one controller, wherein the at least one controller is configured to: receive information regarding authentication of an external device via the communications module; and make a determination regarding unlocking a portable electrical energy storage device locking mechanism to allow the portable electrical energy storage device to be removed from being operably connected to the vehicle, based on the information regarding authentication. The security system may further include the portable electrical energy storage device locking mechanism coupled to the at least one controller; and a power interface that is configured to be coupled to the at least one controller and to an auxiliary power source other than the portable electrical energy storage device to provide power to the electrical energy storage device locking mechanism should the portable electrical energy storage device be not able to provide enough power to operate the electrical energy storage device locking mechanism.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, locking mechanisms, wireless technologies, supercapacitors or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device means any device capable of storing electrical power and releasing stored electrical power including but not limited to batteries, supercapacitors or ultracapacitors. Reference to batteries means chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

Figure 1:
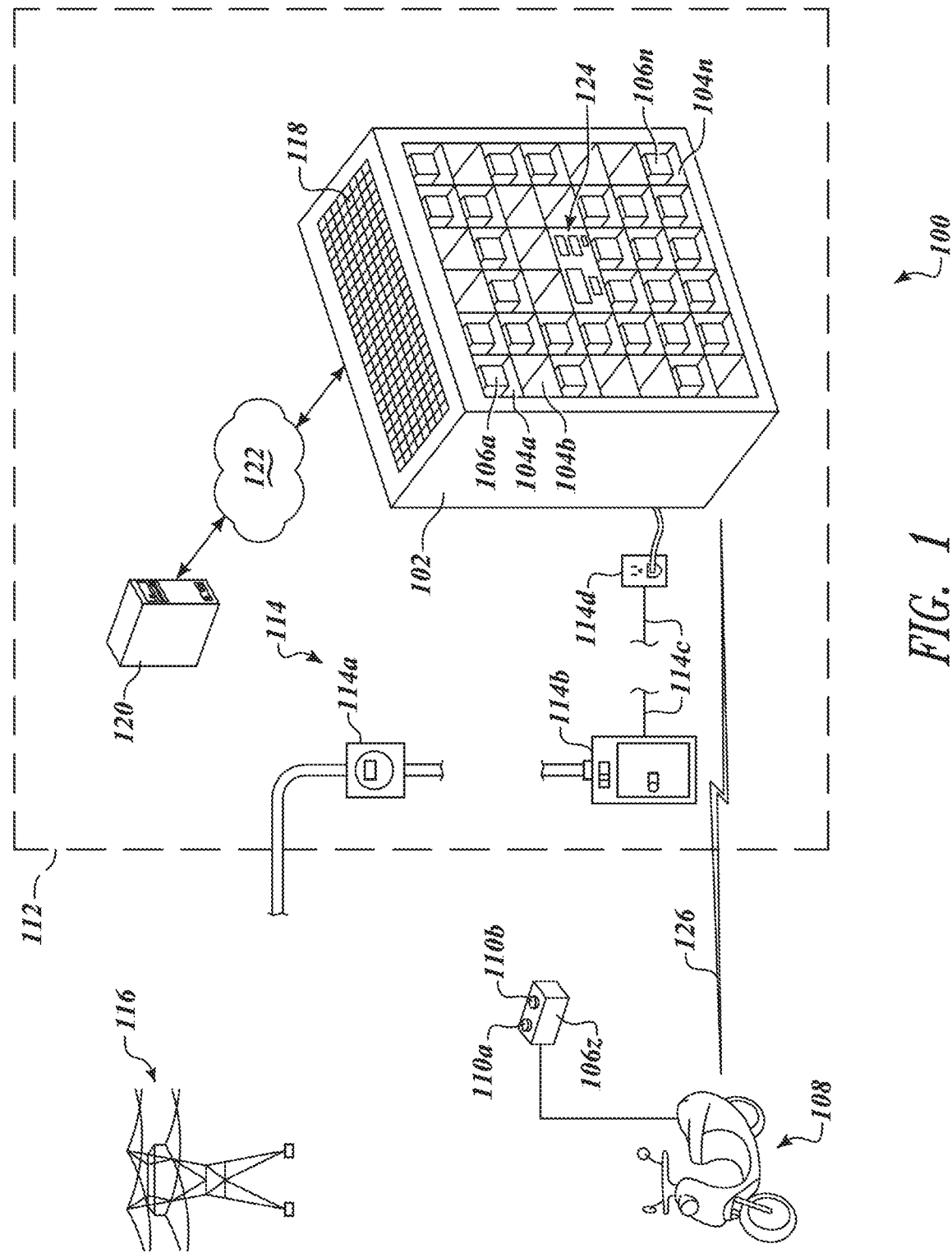
FIG. 1 is a schematic view of a collection, charging and distribution machine along with a number of electrical power storage devices according to one non-limiting illustrated embodiment, along with an electric scooter or motorbike, and an electrical service provided via an electrical grid.

FIG. 1 shows an environment 100 including a collection, charging and distribution machine 102, according to one illustrated embodiment.

The collection, charging and distribution machine 102 may take the form of a vending machine or kiosk. The collection, charging and distribution machine 102 has a plurality of receivers, compartments or receptacles 104a, 104b-104n (only three called out in FIG. 1, collectively 104) to removably receive portable electrical energy storage devices (e.g., batteries, supercapacitors or ultracapacitors) 106a-106n (collectively 106) for collection, charging and distribution. As illustrated in FIG. 1, some of the receivers 104 are empty, while other receivers 104 hold portable electrical energy storage devices 106. While FIG. 1 shows a single portable electrical energy storage device 106 per receiver 104, in some embodiments each receiver 104 may hold two or even more portable electrical energy storage devices 106. For example, each of the receivers 104 may be sufficiently deep to receive three portable electrical energy storage devices 106. Thus, for example, the collection, charging and distribution machine 102 illustrated in FIG. 1 may have a capacity capable of simultaneously holding 40, 80 or 120 portable electrical energy storage devices 106.

The portable electrical energy storage devices 106 may take a variety of forms, for example batteries (e.g., array of battery cells) or supercapacitors or ultracapacitors (e.g., array of ultracapacitor cells). For example, the portable electrical energy storage device 106z may take the form of rechargeable batteries (i.e., secondary cells or batteries). The portable electrical energy storage device 106z may, for instance, be sized to physically fit, and electrically power, personal transportation vehicles, such as all-electric scooters or motorbikes 108. As previously noted, combustion engine scooters and motorbikes are common in many large cities, for example in Asia, Europe and the Middle East. The ability to conveniently access charged batteries throughout a city or region may facilitate the use of all-electric scooters and motorbikes 108 in place of combustion engine scooters and motorbikes, thereby alleviating air pollution, as well as reducing noise.

The portable electrical energy storage devices 106 (only visible for portable electrical energy storage device 106z) may include a number of electrical terminals 110a, 110b (two illustrated, collectively 110), accessible from an exterior of the portable electrical energy storage device 106z. The electrical terminals 110 allow charge to be delivered from the portable electrical energy storage device 106z, as well as allow charge to be delivered to the portable electrical energy storage device 106z for charging or recharging the same. While illustrated in FIG. 1 as posts, the electrical terminals 110 may take any other form which is accessible from an exterior of the portable electrical energy storage device 106z, including electrical terminals positioned within slots in a battery housing. As the portable electrical energy storage devices 106 may be lent, leased, and/or rented out to the public, it is desirable to control how and in what circumstances the portable electrical energy storage devices 106 may be removed from being operably connected to the vehicle for which they provide power. This control of the physical security of the portable electrical energy storage devices 106 helps to prevent theft and/or misuse of the portable electrical energy storage devices 106. Systems and methods for physical security of the portable electrical energy storage devices 106, including a security system for controlling removal of the portable electrical energy storage devices 106 from a vehicle, are described in more detail below with reference to FIGS. 3-9, and are useful in the overall system for collection, charging and distribution of the portable electrical energy storage devices 106 described herein.

The collection, charging and distribution machine 102 is positioned at some location 112 at which the collection, charging and distribution machine 102 is conveniently and easily accessible by various end users. The location may take any of a large variety of forms, for example, a retail environment such as a convenience store, supermarket, gas or petrol station, or service or service center. Alternatively, the collection, charging and distribution machine 102 may stand alone at a location 112 not associated with an existing retail or other business, for example in public parks or other public places. Thus, for example, collection, charging and distribution machines 102 may be located at each store of a chain of convenience stores throughout a city or region. Such may advantageously rely on the fact that convenience stores are often sited or distributed based on convenience to the target population or demographic. Such may advantageously rely on pre-existing leases on storefronts or other retail locations to allow an extensive network of collection, charging and distribution machines 102 to be quickly developed in a city or region. Quickly achieving a large network that provides for physical security of the of portable electrical energy storage devices 106 while in the all-electric scooters or motorbikes 108 enhances the ability to depend on such a system and likely commercial success of such an effort.

The location 112 may include an electrical service 114 to receive electrical power from a generating station (not shown) for example via a grid 116. The electrical service 114 may, for example, include one or more of an electrical service meter 114a, a circuit panel (e.g., circuit breaker panel or fuse box) 114b, wiring 114c, and electrical outlet 114d. Where the location 112 is an existing retail or convenience store, the electrical service 114 may be an existing electrical service, so may be somewhat limited in rating (e.g., 120 volts, 240 volts, 220 volts, 230 volts, 15 amps).

Optionally, the collection, charging and distribution machine 102 may include or be coupled to a source of renewable electrical power. For example, where installed in an outside location the collection, charging and distribution machine 102 may include an array of photovoltaic (PV) cells 118 to produce electrical power from solar insolation. Alternatively, the collection, charging and distribution machine 102 may be electrically coupled to a microturbine (e.g., wind turbine) or PV array positioned elsewhere at the location 112, for instance on a roof top or mounted at a top of a pole (not shown).

The collection, charging and distribution machine 102 may be communicatively coupled to one or more remotely located computer systems, such as back end or back office systems (only one shown) 120. The back end or back office systems 120 may collect data from and/or control a plurality of collection, charging and distribution machines 102 distributed about an area, such as a city. In some embodiments, the back end or back office systems 120 may collect data from and/or control a plurality of the portable electrical energy storage devices 106, such as by generating, tracking, sending and/or receiving one or more codes included in a wireless signal 126 sent by the collection, charging and distribution machine 102 to an all-electric scooter or motorbike 108 or other vehicle. The sending and/or receiving one or more codes enables access to the portable electrical energy storage devices 106 for removal from a respective all-electric scooter or motorbike 108 while the all-electric scooter or motorbike 108 is in the vicinity of the collection, charging and distribution machine 102. The communications between the back end or back office systems 120 and the collection, charging and distribution machine 102 may occur over one or more communications channels including one or more networks 122, or non-networked communications channels. Communications may be over one or more wired communications channels (e.g., twisted pair wiring, optical fiber), wireless communications channels (e.g., radio, microwave, satellite, 801.11 compliant). Networked communications channels may include one or more local area networks (LANs), wide area networks (WANs), extranets, intranets, or the Internet including the World Wide Web portion of the Internet.

The collection, charging and distribution machine 102 may include a user interface 124. The user interface may include a variety of input/output (I/O) devices to allow an end user to interact with the collection, charging and distribution machine 102. Various I/O devices are called out and described in reference to FIG. 2, which follows.

Figure 2:
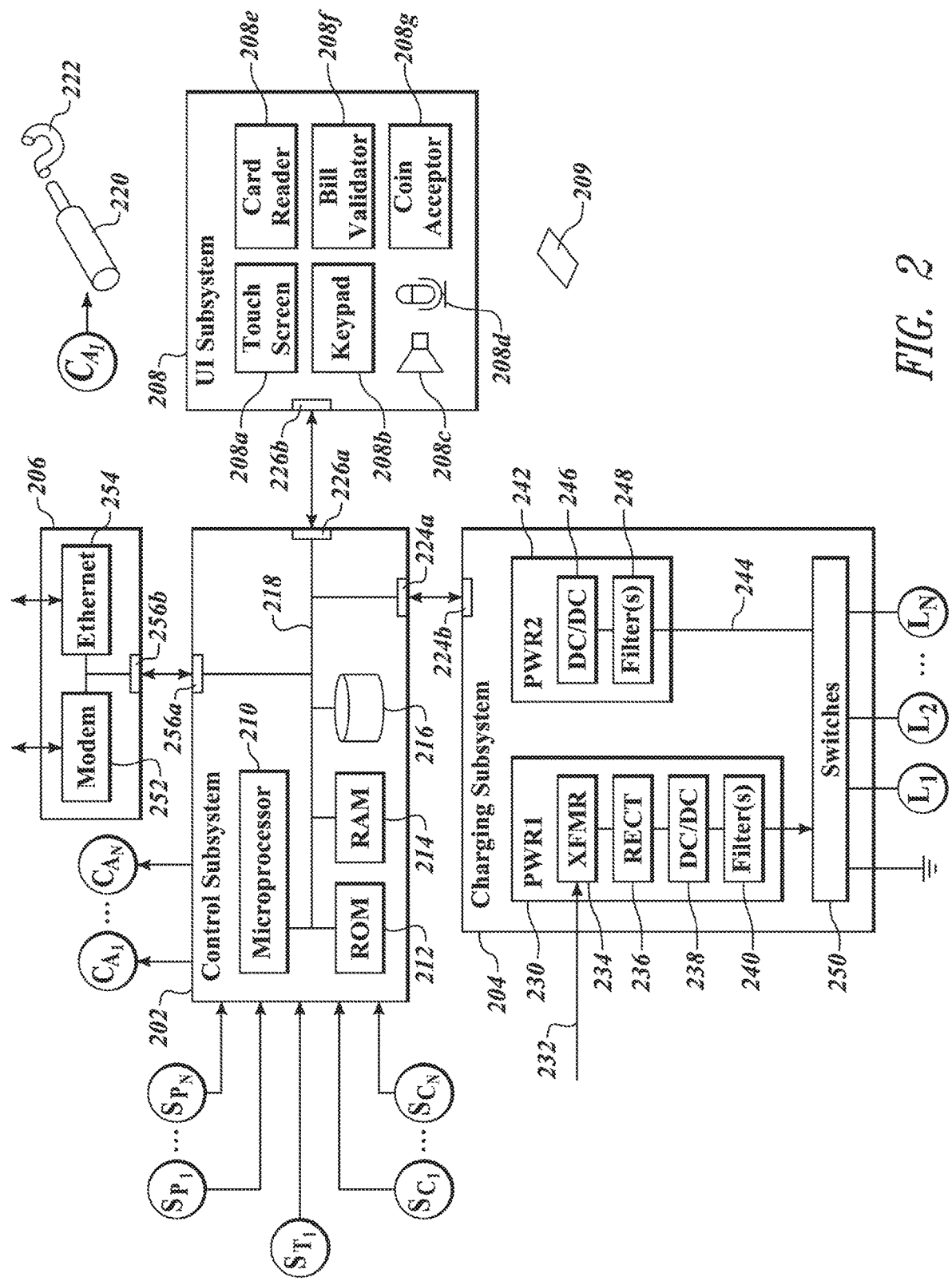
FIG. 2 is a block diagram of the collection, charging and distribution machine of FIG. 1, according to one non-limiting illustrated embodiment.

FIG. 2 shows the collection, charging and distribution machine 102 of FIG. 1, according to one illustrated embodiment.

The collection, charging and distribution machine 102 includes a control subsystem 202, a charging subsystem 204, a communications subsystem 206, and a user interface subsystem 208.

The control subsystem 202 includes a controller 210, for example a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 210 may take the form of a microprocessor (e.g., INTEL, AMD, ATOM). The control subsystem 202 may also include one or more non-transitory processor- or computer-readable storage media, for example read only memory (ROM) 212, random access memory (RAM) 214, and data store 216 (e.g., solid-state storage media such as flash memory or EEPROM, or spinning storage media such as hard disk). The non-transitory processor- or computer-readable storage media 212, 214, 216 may be in addition to any non-transitory storage medium (e.g., registers) which is part of the controller 210. The control subsystem 202 may include one or more buses 218 (only one illustrated) coupling various components together, for example one or more power buses, instruction buses, data buses, etc.

As illustrated, the ROM 212, or some other one of the non-transitory processor- or computer-readable storage media 212, 214, 216, stores instructions and/or data or values for variables or parameters. The sets of data may take a variety of forms, for example a lookup table, a set of records in a database, etc. The instructions and sets of data or values are executable by the controller 110. Execution of the instructions and sets of data or values causes the controller 110 to perform specific acts to cause the collection, charging and distribution machine 102 to collect, charge, and distribute portable energy storage devices, and to send one or more signals that enable access to the portable electrical energy storage devices 106 for removal from the all-electric scooters or motorbikes 108 while the all-electric scooters or motorbikes 108 are in the vicinity of a collection, charging and distribution machine 102. Specific operation of the collection, charging and distribution machine 102 is described herein and also below with reference to FIG. 3 and various flow diagrams (FIGS. 7-9) in the context of being an external device which is authenticated in order to allow the portable electrical energy storage device 106 to be removed from being operably connected to the all-electric scooter or motorbike 108.

The controller 210 may use RAM 214 in a conventional fashion, for volatile storage of instructions, data, etc. The controller 210 may use data store 216 to log or retain information, for example one or more codes that enable access to the portable electrical energy storage devices 106 for removal from the all-electric scooters or motorbikes 108 while the all-electric scooters or motorbikes 108 are in the vicinity of the collection, charging and distribution machine 102, and/or information related to operation of the collection, charging and distribution machine 102 itself. The instructions are executable by the controller 210 to control operation of the collection, charging and distribution machine 102 in response to end user or operator input, and using data or values for the variables or parameters.

The control subsystem 202 receives signals from various sensors and/or other components of the collection, charging and distribution machine 102 which include information that characterizes or is indicative of operation, status, or condition of such other components. Sensors are represented in FIG. 2 by the letter S appearing in a circle along with appropriate subscript letters.

For example, one or more position sensors $S_{P1}$-$S_{PN}$ may detect the presence or absence of a portable electrical power storage device 106 at each of the receivers 104. The position sensors $S_{P1}$-$S_{PN}$ may take a variety of forms. For example, the position sensors $S_{P1}$-$S_{PN}$ may take the form of mechanical switches that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of optical switches (i.e., optical source and receiver) that are closed, or alternatively opened, in response to contact with a portion of a respective portable electrical power storage device 106 when the portable electrical power storage device 106 is inserted into the receiver 104. Also for example, the position sensors $S_{P1}$-$S_{PN}$ may take the form of electrical sensors or switches that are closed, or alternatively opened, in response to detecting a closed circuit condition created by contact with the terminals 110 of a respective portable electrical power storage device 106 when the portable electrical power storage device 106 is inserted into the receiver 104, or an open circuit condition that results from the lack of a respective portable electrical power storage device 106 in the receiver 104. These examples are intended to be non-limiting, and it is noted that any other structures and devices for detecting the presence/absence or even the insertion of the portable electrical power storage devices 106 into receivers may be employed.

For example, one or more charge sensors $S_{C1}$-$S_{CN}$ may detect charge of the portable electrical power storage devices 106 at each of the receivers 104. Charge sensors $S_{C1}$-$S_{CN}$ may detect the amount of charge stored by the portable electrical power storage devices 106. Charge sensors $S_{C1}$-$S_{CN}$ may additionally detect an amount of charge and/or rate of charging being supplied to ones of the portable electrical power storage devices 106 at each of the receivers 104. Such may allow assessment of current (i.e., temporal) charge condition or status of each portable electrical power storage device 106, as well as allow feedback control over charging of same, including control over rate of charging. Charge sensors $S_{C1}$-$S_{CN}$ may include any variety of current and/or voltage sensors.

For example, one or more charge sensors $S_{T1}$ (only one shown) may detect or sense a temperature at the receivers 104 or in the ambient environment.

The control subsystem 202 provides signals to various actuators and/or other components responsive to control signals, which signals include information that characterizes or is indicative of an operation the component is to perform or a state or condition into which the components should enter. Control signals, actuators or other components responsive to control signals are represented in FIG. 2 by the letter C appearing in a circle along with appropriate subscript letters.

For example, one or more engine control signals $C_{A1}$-$C_{AN}$ may affect the operation of one or more actuators 220 (only one illustrated). For instance, a control signal $C_{A1}$ may cause movement of an actuator 220 between a first and a second position or change a magnetic field produced by the actuator 220. The actuator 220 may take any of a variety of forms, including but not limited to a solenoid, an electric motor such as a stepper motor, or an electromagnet. The actuator 220 may be coupled to operate a latch, lock or other retainer mechanism 222. The latch, lock or other retainer mechanism 222 may selectively secure or retain one or more portable electrical power storage devices 106 (FIG. 1) in the receiver 104 (FIG. 1). For instance, the latch, lock or other retainer mechanism 222 may physically couple to a complimentary structure that is part of a housing of the portable electrical power storage devices 106 (FIG. 1). Alternatively, the latch, lock or other retainer mechanism 222 may magnetically couple to a complimentary structure that is part of a housing of the portable electrical power storage devices 106 (FIG. 1). Also for instance, the latch, lock or other retainer mechanism 222 may open a receiver 104 (FIG. 1), or may allow a receiver 104 to be opened, to receive a partially or fully discharged portable electrical power storage device 106 for charging. For example, the actuator may open and/or close a door to the receiver 104 (FIG. 1), to selectively provide access to a portable electrical power storage device 106 (FIG. 1) received therein. Also for example, the actuator may open and/or close a latch or lock, allowing an end user to open and/or close a door to the receiver 104 (FIG. 1), to selectively provide access to a portable electrical power storage device 106 (FIG. 1) received therein.

The control subsystem 202 may include one or more ports 224a to provide control signals to one or more ports 224b of the charging subsystem 204. The ports 224a, 224b may provide bi-directional communications. The control subsystem 202 may include one or more ports 226a to provide control signals to one or more ports 226b of the user interface subsystem 208. The ports 226a, 226b may provide bi-directional communications.

The charging subsystem 204 includes various electrical and electronic components to charge portable electrical power storage devices 106 when positioned or received in the receivers 104. For example, the charging subsystem 204 may include one or more power buses or power bus bars, relays, contactors or other switches (e.g., insulated gate bipolar transistors or IGBTs, metal oxide semiconductor transistors or MOSFETs), rectifier bridge(s), current sensors, ground fault circuitry, etc. The electrical power is supplied via contacts that can take any of a variety of forms, for instance terminals, leads, posts, etc. The contacts allow electrical coupling of various components. Some possible implementations are illustrated in FIG. 2. Such is not intended to be exhaustive. Additional components may be employed while other components may be omitted.

The illustrated charging subsystem 204 includes a first power converter 230 that receives electrical power from the electrical service 114 (FIG. 1) via a line or cord 232. The power will typically be in the form of single two- or three-phase AC electrical power. As such, the first power converter 230 may need to convert and otherwise condition the electrical power received via the electrical services 114 (FIG. 1), for example for rectifying an AC waveform to DC, transforming voltage, current, and phase, as well as reducing transients and noise. Thus, the first power converter 230 may include a transformer 234, rectifier 236, DC/DC power converter 238, and filter(s) 240.

The transformer 234 may take the form of any variety of commercially available transformers with suitable ratings for handling the power received via the electrical service 114 (FIG. 1). Some embodiments may employ multiple transformers. The transformer 234 may advantageously provide galvanic isolation between the components of the collection, charging and distribution machine 102 and the grid 116 (FIG. 1). The rectifier 236 may take any of variety of forms, for example a full bridge diode rectifier or a switch mode rectifier. The rectifier 236 may be operated to transform AC electrical power to DC electrical power. The DC/DC power converter 238 may take any of a large variety of forms. For example, DC/DC power converter 238 may take the form a switch mode DC/DC power converter, for instance employing IGBTs or MOSFETs in a half or full bridge configuration, and may include one or more inductors. The DC/DC power converter 238 may have any number of topologies including a boost converter, buck converter, synchronous buck converter, buck-boost converter or fly-back converter. The filter(s) 240 may include one or more capacitors, resistors, Zener diodes or other elements to suppress voltage spikes, or to remove or reduce transients and/or noise.

The illustrated charging subsystem 204 may also receive electrical power from a renewable power source, for example the PV array 118 (FIG. 1). Such may be converted or conditioned by the first power converter 230, for example being supplied directly to the DC/DC power converter 238, bypassing the transformer 236 and/or rectifier 236. Alternatively, the illustrated charging subsystem 204 may include a dedicated power converter to convert or otherwise condition such electrical power.

The illustrated charging subsystem 204 may optionally include second power converter 242 that receives electrical power from one or more portable electrical power storage devices 106 (FIG. 1) via one or more lines 244, for charging other ones of the portable electrical power storage devices 106. As such, the second power converter 242 may need to convert and/or otherwise condition the electrical power received from portable electrical power storage devices 106, for example optionally transforming voltage or current, as well as reducing transients and noise. Thus, the second power converter 242 may optionally include a DC/DC power converter 246 and/or filter(s) 248. Various types of DC/DC power converters and filters are discussed above.

The illustrated charging subsystem 204 includes a plurality of switches 250 responsive to the control signals delivered via ports 224a, 224b from the control subsystem 202. The switches may be operable to selectively couple a first number or set of portable electrical power storage devices 106 to be charged from electrical power supplied by both the electrical service via the first power converter 230 and from electrical power supplied by a second number or set of portable electrical power storage devices 106. The first number or set of portable electrical power storage devices 106 may include a single portable electrical power storage device 106, two, or even more portable electrical power storage devices 106. The second number or set of portable electrical power storage devices 106 may include a single portable electrical power storage device 106, two, or even more portable electrical power storage devices 106. The portable electrical power storage devices 106 are represented in FIG. 2 as loads $L_1, L_2$-$L_N$.

The communications subsystem 206 may additionally include one or more communications modules or components which facilitate communications with the various components of a back end or back office system 120 (FIG. 1), various components of the all-electric scooter or motorbike 108, and/or various components of the portable electrical power storage devices 106. The communications subsystem 206 may, for example, include one or more modems 252 and/or one or more Ethernet cards or other types of communications cards or components 254. A port 256a of the control subsystem 202 may communicatively couple the control subsystem 202 with a port 256b of the communications subsystem 206. The communications subsystem 206 may provide wired and/or wireless communications. For example, the communications subsystem 206 may provide components enabling short range (e.g., via Bluetooth, near field communication (NFC), radio frequency identification (RFID) components and protocols) or longer range wireless communications (e.g., over a wireless LAN, satellite, or cellular network) with various other devices external to the collection, charging and distribution machine 102, including various components of the all-electric scooter or motorbike 108, and/or various components of the portable electrical power storage devices 106. The communications subsystem 206 may include one or more ports, wireless receivers, wireless transmitters or wireless transceivers to provide wireless signal paths to the various remote components or systems. The communications subsystem 206 may include one or more bridges or routers suitable to handle network traffic including switched packet type communications protocols (TCP/IP), Ethernet or other networking protocols.

The user interface subsystem 208 includes one or more user input/output (I/O) components. For example, user interface subsystem 208 may include a touch screen display 208a operable to present information to an end user, and a graphical user interface (GUI) to receive indications of user selections. The user interface subsystem 208 may include a keyboard or keypad 208b, and/or a cursor controller (e.g., mouse, trackball, trackpad) (not illustrated) to allow an end user to enter information and/or select user selectable icons in a GUI. The user interface subsystem 208 may include a speaker 208c to provide aural messages to an end user and/or a microphone 208d to receive spoken user input such as spoken commands.

The user interface subsystem 208 may include a card reader 208e to read information from card type media 209. The card reader 208e may take a variety of forms. For instance, the card reader 208e may take the form of, or include, a magnetic stripe reader for reading information encoded in a magnetic stripe carried by a card 209. For instance, the card reader 208e may take the form of, or include, a machine-readable symbol (e.g., barcode, matrix code) card reader for reading information encoded in a machine-readable symbol carried by a card 209. For instance, the card reader 208e may take the form of, or include, a smart card reader for reading information encoded in a non-transitory medium carried by a card 209. Such may, for instance, include media employing radio frequency identification (RFID) transponders or electronic payment chips (e.g., near filed communications (NFC) chips). Thus, the card reader 208e may be able to read information from a variety of card media 209, for instance credit cards, debit cards, gift cards, prepaid cards, as well as identification media such as drivers licenses. The card reader 208e may also be able to read information encoded in a non-transitory medium carried by the portable electrical energy storage devices 106, and may also include RFID transponders, transceivers, NFC chips and/or other communications devices to communicate information to various components of the all-electric scooter or motorbike 108, and/or various components of the portable electrical power storage devices 106 (e.g., for authentication of the collection, charging and distribution machine 102 to the portable electrical energy storage devices 106 and/or the all-electric scooter or motorbike 108, or for authentication of the portable electrical energy storage devices 106 to the collection, charging and distribution machine 102).

The user interface subsystem 208 may include a bill acceptor 208f and a validator and/or coin acceptor 208g to accept and validate cash payments. Such may be highly useful in servicing populations lacking access to credit. Bill acceptor and validator 208f and/or coin acceptor 208g may take any variety of forms, for example those that are currently commercially available and used in various vending machines and kiosks.

Figure 3:
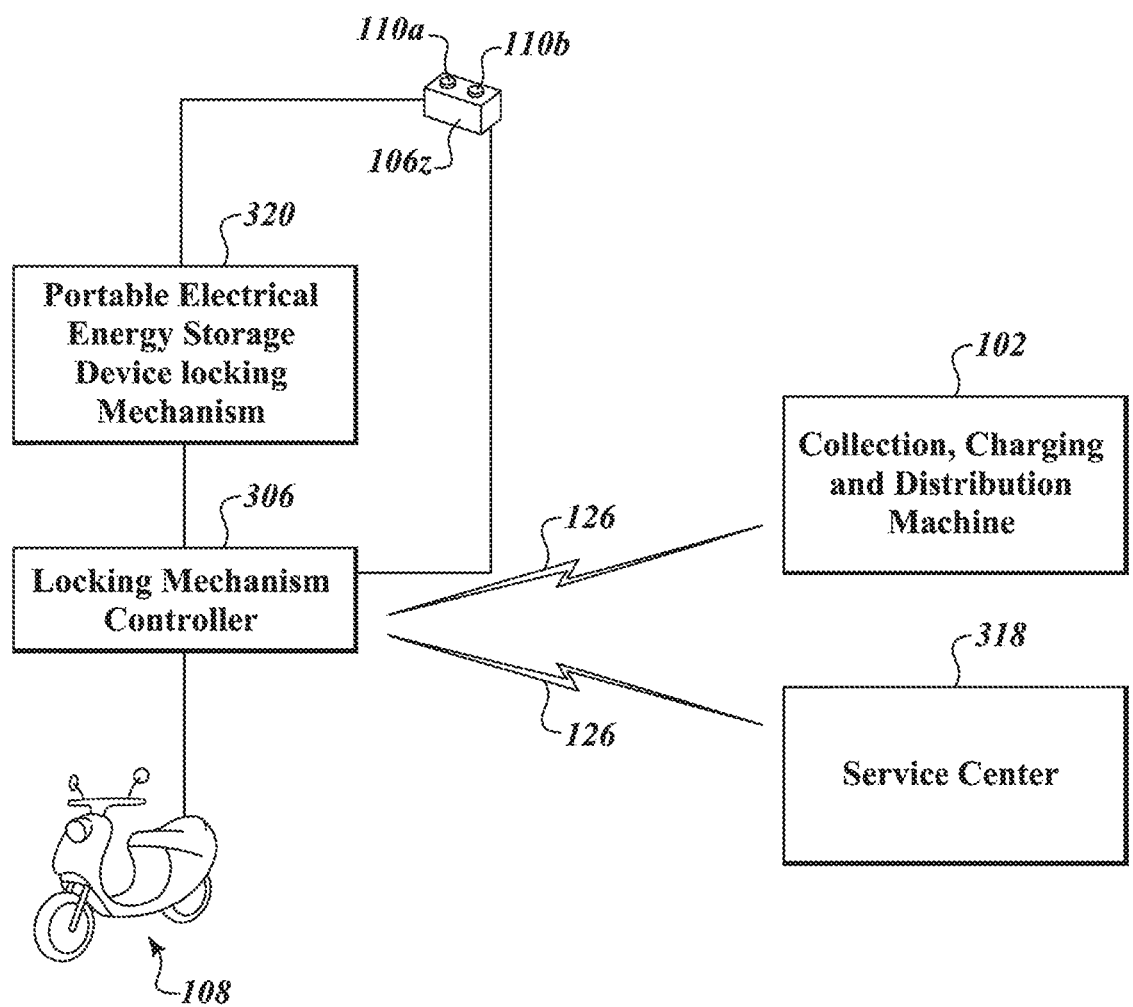
FIG. 3 is a block diagram of a portable electrical energy storage device physical security system for the portable electrical energy storage device of the scooter or motorbike of FIG. 1 in wireless communication in one instance with the collection, charging and distribution machine of FIG. 1 and in another instance with a scooter or motorbike service center, according to one non-limiting illustrated embodiment.

FIG. 3 shows a portable electrical energy storage device physical security system for the portable electrical energy storage device 106z of the scooter or motorbike 108 in wireless communication in one instance with the collection, charging and distribution machine 102 and in another instance with a device at a scooter or motorbike service center 318, according to one non-limiting illustrated embodiment.

Shown is a portable electrical energy storage device locking mechanism 320 operably coupled to a locking mechanism controller 306. In some embodiments, the portable electrical energy storage device locking mechanism 320 and the locking mechanism controller 306 are part of the scooter or motorbike 108. In other embodiments, the portable electrical energy storage device locking mechanism 320 and the locking mechanism controller 306 are integrated with or part of the portable electrical energy storage device 106z.

Also shown is the collection, charging and distribution machine 102 in wireless communication with the locking mechanism controller 306. For example, the communications subsystem 206 (shown in FIG. 2) of the collection, charging and distribution machine 102 may provide components enabling short range (e.g., via Bluetooth, near field communication (NFC), radio frequency identification (RFID) components and protocols) or longer range wireless communications (e.g., over a wireless LAN, satellite, or cellular network) with various other devices external to the collection, charging and distribution machine 102, including the locking mechanism controller 306. The communications subsystem 206 of the collection, charging and distribution machine 102 may include one or more ports, wireless receivers, wireless transmitters or wireless transceivers to provide wireless signal paths to the locking mechanism controller 306. The communications subsystem 206 of the collection, charging and distribution machine 102 may also or instead include one or more bridges or routers suitable to handle network traffic including switched packet type communications protocols (TCP/IP), Ethernet or other networking protocols.

The portable electrical energy storage device 106z may be lent, leased, and/or rented out to the public. Since the portable electrical energy storage device 106z is typically a relatively expensive component, it is desirable to control how and in what circumstances the portable electrical energy storage device 106z may be removed from being operably connected or attached to the scooter or motorbike 108 for which it provides power. This control of the physical security of the portable electrical energy storage device 106z helps to prevent theft and/or misuse of the portable electrical energy storage device 106z. For example, the portable electrical energy storage device 106z may be operably connected to and physically locked or otherwise physically secured in the scooter or motorbike 108 until the locking mechanism controller 306 detects a wireless signal including authentication information from an external device such as the collection, charging and distribution machine 102 or a device at a service center 306 with one or more wireless communications subsystems such as that described above of the collection, charging and distribution machine 102. Other such external devices (not shown) with one or more wireless communications subsystems such as that described above of the collection, charging and distribution machine 102 may include, but are not limited to: card keys, access cards, credit cards, access control key fobs, mobile computing devices, cellular telephones, personal digital assistants (PDAs), smart phones, battery chargers, other access control devices, etc.

The collection, charging and distribution machine 102 may periodically, constantly or aperiodically emit a wireless signal 126 for a locking mechanism controller 306 listening for such a signal to receive and authenticate the collection, charging and distribution machine 102 in order to trigger the portable electrical energy storage device locking mechanism 320 to unlock, enabling the portable electrical energy storage device 106z to be removed from the scooter or motorbike 108. Also or instead, the locking mechanism controller 306 may periodically or constantly emit a wireless signal 126 to which a collection, charging and distribution machine 102 listening for such a signal will respond with a wireless signal for the locking mechanism controller 306 to receive and authenticate the collection, charging and distribution machine 102 in order to trigger the portable electrical energy storage device locking mechanism 320 to unlock, enabling the portable electrical energy storage device 106z to be removed from the scooter or motorbike 108.

In some embodiments, the wireless signal received from the collection, charging and distribution machine 102 may include a code that may be authenticated by the locking mechanism controller 306 in order to ensure the signal is being received from an authorized device. For example, the code may be time-sensitive code such as a "hopping" code or a "rolling" code to provide such security. In the case of a 40-bit rolling code, forty bits provide 240 (about 1 trillion) possible codes. However, codes of other bit lengths may be used instead. The collection, charging and distribution machine 102 memory (e.g., ROM 212) may hold the current 40-bit code. The collection, charging and distribution machine 102 then sends that 40-bit code to the locking mechanism controller 306 for the locking mechanism controller 306 to unlock the portable electrical energy storage device locking mechanism 320. The locking mechanism controller 306 also holds the current 40-bit code. If the locking mechanism controller 306 receives the 40-bit code it expects, then it unlocks the portable electrical energy storage device locking mechanism 320. If the locking mechanism controller 306 does not receive the 40-bit code it expects, the locking mechanism controller 306 does nothing. In some embodiments, the locking mechanism controller 306 will lock the portable electrical energy storage device locking mechanism 320 if the portable electrical energy storage device locking mechanism 320 is in an unlocked state and the locking mechanism controller 306 does not receive the 40-bit code it expects, or is not able to receive any signal over a determined period of time.

Both the collection, charging and distribution machine 102 and the locking mechanism controller 306 use the same pseudo-random number generator (e.g., implemented by the respective processors of the collection, charging and distribution machine 102 and the locking mechanism controller 306) to generate the 40-bit code. The collection, charging and distribution machine 102 may have different pseudo-random number generators to match the pseudo-random number generator of each locking mechanism controller 306 of each scooter or motorbike 108 or of each of the portable electrical energy storage devices 106. When the locking mechanism controller 306 receives a valid code form the collection, charging and distribution machine 102, it uses the same pseudo-random number generator to generate the next code relative to the valid code received and communicates wirelessly with the collection, charging and distribution machine 102 to instruct it to also generate the next code using the same pseudo-random number generator, which the collection, charging and distribution machine 102 stores for the next use. In this way, the collection, charging and distribution machine 102 and the locking mechanism controller 306 are synchronized. The locking mechanism controller 306 only unlocks the portable electrical energy storage device locking mechanism 320 if it receives the code it expects.

Also, the current 40-bit code or other time-sensitive rolling code may be generated and communicated to one or more other collection, charging and distribution machines within a network of collection, charging and distribution machines (e.g., via the network 122 shown in FIG. 1) so that any collection, charging and distribution machine 102 may communicate the correct current code to the locking mechanism controller 306 when the scooter or motorbike having the locking mechanism controller 306 or the portable electrical energy storage device 106z having the locking mechanism controller 306 comes within wireless signal range of the other collection, charging and distribution machines. In some embodiments, the locking mechanism controller 306 may accept any of the next 256 possible valid codes in the pseudo-random number sequence. This way, if the locking mechanism controller 306 and the collection, charging and distribution machine 102 for some reason become unsynchronized by 256 rolling codes or less, the locking mechanism controller 306 would still accept the transmission from the collection, charging and distribution machine 102, unlock the portable electrical energy storage device locking mechanism 320 and generate the next code relative to the valid code received.

In other embodiments, the hopping, rolling or time-sensitive code may be a universal code communicated by the back end or back office system 120 to the collection, charging and distribution machine 102 and communicated wirelessly to the locking mechanism controller 306. For example, this may occur over a WAN, LAN and/or when the locking mechanism controller 306 comes within wireless communications range of the collection, charging and distribution machine 102 such as when the scooter or motorbike 108 visits the collection, charging and distribution machine 102.

In some embodiments, the locking mechanism controller 306 and the collection, charging and distribution machine store a common secret key or code and use a common secret algorithm for authentication of the collection, charging and distribution machine. The common secret algorithm, for example, can be a hash function or other algorithm which takes the secret key and at least one other key or code as input and generates different output based on the secret key and different input. The common secret algorithm may be executed by respective processors of the locking mechanism controller 306 and the collection, charging and distribution machine using stored instructions on respective computer readable media of the locking mechanism controller 306 and the collection, charging and distribution machine or on respective configured hardware or firmware components of the of locking mechanism controller 306 and collection, charging and distribution machine. The common secret algorithm and common secret key or code may be initially encoded, programmed or installed in the locking mechanism controller 306 and collection, charging and distribution machine in a secure fashion such that they are irretrievable or otherwise protected from being discovered. The common secret algorithm and common secret key or code are not communicated between the locking mechanism controller 306 and collection, charging and distribution machine during the authentication process.

In response to receiving an authentication beacon or request from the collection, charging and distribution machine via the wireless signal 126 (which may have been sent in response to a wireless signal or beacon received from the locking mechanism controller 306), the locking mechanism controller 306 generates a challenge key and sends this challenge key to the collection, charging and distribution machine. In response to receiving the challenge key, the collection, charging and distribution machine uses the secret algorithm and the common secret key to generate a response value and sends this response value to the locking mechanism controller 306. The locking mechanism controller 306 then verifies the response value by using the generated challenge key and secret key as input to the secret algorithm to generate an output value from the secret algorithm. The locking mechanism controller 306 then compares this output value from the secret algorithm to the response value received from the collection, charging and distribution machine. If the output from the secret algorithm generated by the locking mechanism controller 306 and the response value received from the collection, charging and distribution machine match, then the collection, charging and distribution machine is authenticated and the locking mechanism controller 306 may then take actions accordingly, such as sending a control signal to the locking mechanism 320 to unlock. If the output from the secret algorithm generated by the locking mechanism controller 306 and the response value received from the collection, charging and distribution machine do not match, then the collection, charging and distribution machine is not authenticated and the locking mechanism controller 306 may then take no action, or take other actions accordingly, such as sending a control signal to the locking mechanism 320 to lock if not already locked. In some embodiments any authentication process involving using any combination of a public key and or public algorithm may be used.

Once the locking mechanism controller 306 can no longer receive the wireless signal 126 from the collection, charging and distribution machine 102 (e.g., after the scooter or motorbike has already exchanged the portable electrical energy storage device 106z at the collection, charging and distribution machine 102 and is no longer within range of the collection, charging and distribution machine 102 wireless signal 126), the locking mechanism controller 306 will send a signal to cause the portable electrical energy storage device locking mechanism 320 to lock to prevent the portable electrical energy storage device 106z from being able to be removed from being operably connected to the scooter or motorbike 108. Also, as described above, if the signal received from the collection, charging and distribution machine 102 or other device contains an invalid code, if not already locked, the locking mechanism controller 306 will send a signal to cause the portable electrical energy storage device locking mechanism 320 to lock to prevent the portable electrical energy storage device 106z from being able to be removed from being operably connected to the scooter or motorbike. In some instances, where the locking mechanism controller 306 is not part of the portable electrical energy storage device 106z, the locking mechanism controller 306 must detect the presence of the portable electrical energy storage device 106z in the scooter or motorbike 108 before sending a signal to cause the portable electrical energy storage device locking mechanism 320 to lock.

In some embodiments, the wireless portion of the authentication is strongly phased. Nearby, the system challenges some or all portable electrical energy storage device collection, charging and distribution machines that would wirelessly tell the vehicle to disengage the portable electrical energy storage device in order to swap the portable electrical energy storage device. Also, the portable electrical energy storage device collection, charging and distribution machine/service center may be mobile. For example, a service vehicle may come to a broken down/out of charge vehicle on the side of the road and the portable electrical energy storage device can only release when the authenticated service vehicle is nearby. "Nearby", may be any range of distance selected by the system within range of short range wireless signal. A very short close distance may also be used, for example, as in some embodiments, the system may use technology such as near field communications (NFC) or other near field or very short range technologies.

Figure 4:
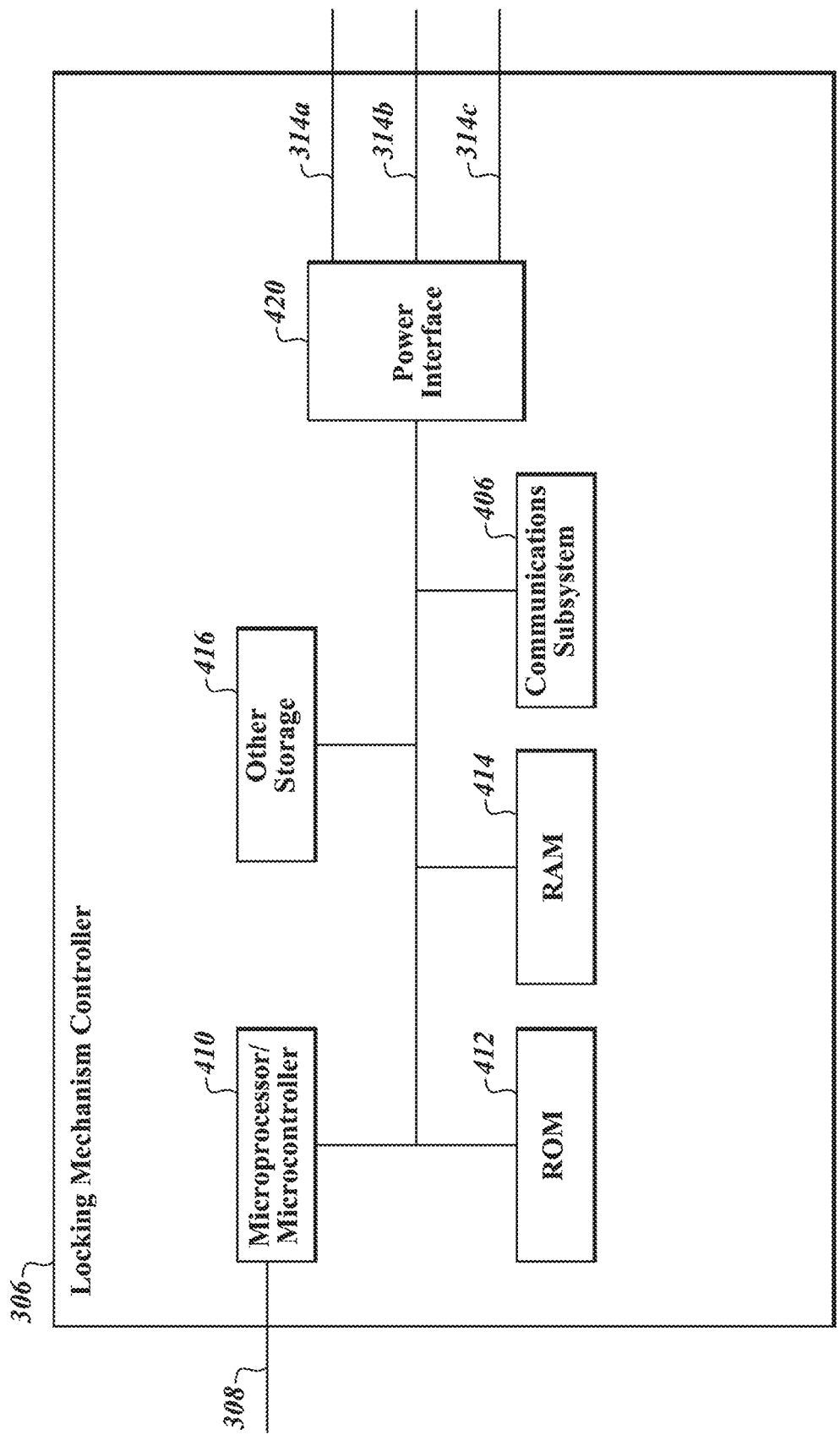
FIG. 4 is a schematic view of the locking mechanism controller of FIG. 3, according to one non-limiting illustrated embodiment.

FIG. 4 is a schematic view of the locking mechanism controller of FIG. 3, according to one non-limiting illustrated embodiment.

The locking mechanism controller 306 includes a controller 410, a communications subsystem 406, and a power interface 420.

The controller 410, for example, is a microprocessor, microcontroller, programmable logic controller (PLC), programmable gate array (PGA), application specific integrated circuit (ASIC) or another controller capable of receiving signals from various sensors, performing logical operations, and sending signals to various components. Typically, the controller 410 may take the form of a microprocessor (e.g., INTEL, AMD, ATOM). The locking mechanism controller 306 may also include one or more non-transitory processor- or computer-readable storage media, for example read only memory (ROM) 412, random access memory (RAM) 414, and other storage 416 (e.g., solid-state storage media such as flash memory or EEPROM, or spinning storage media such as hard disk). The non-transitory processor- or computer-readable storage media 412, 414, 416 may be in addition to any non-transitory storage medium (e.g., registers) which is part of the controller 410. The locking mechanism controller 306 may include one or more buses 418 (only one illustrated) coupling various components together, for example one or more power buses, instruction buses, data buses, etc.

Figure 7:
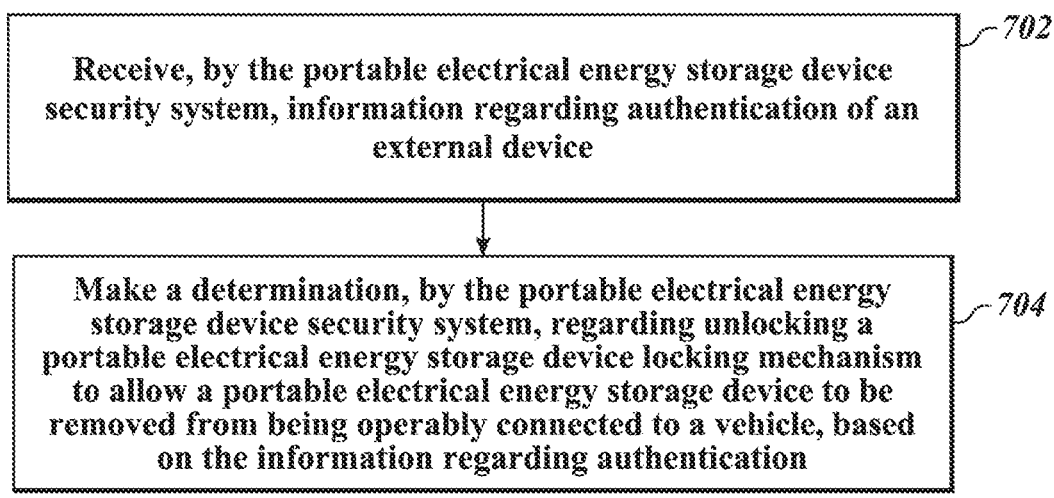
FIG. 7 is a flow diagram showing a high level method of operating the locking mechanism controller of FIGS. 3-6, according to one non-limiting illustrated embodiment.
Figure 8:
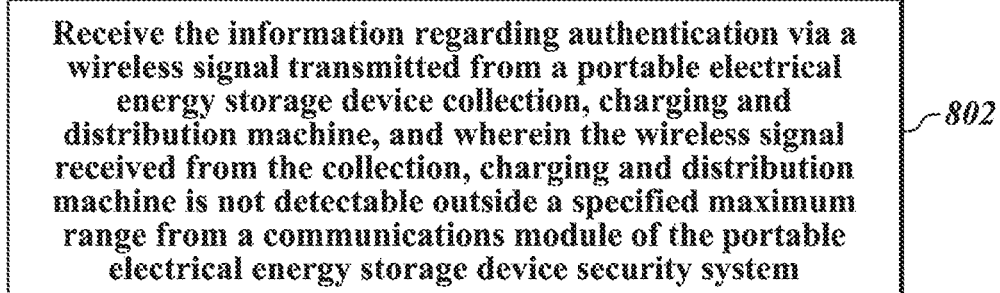
FIG. 8 is a flow diagram showing a low level method of operating the locking mechanism controller of FIGS. 3-6, according to one non-limiting illustrated embodiment, including accepting the portable electrical energy storage device charge, useful in the method of FIG. 7.
Figure 9:
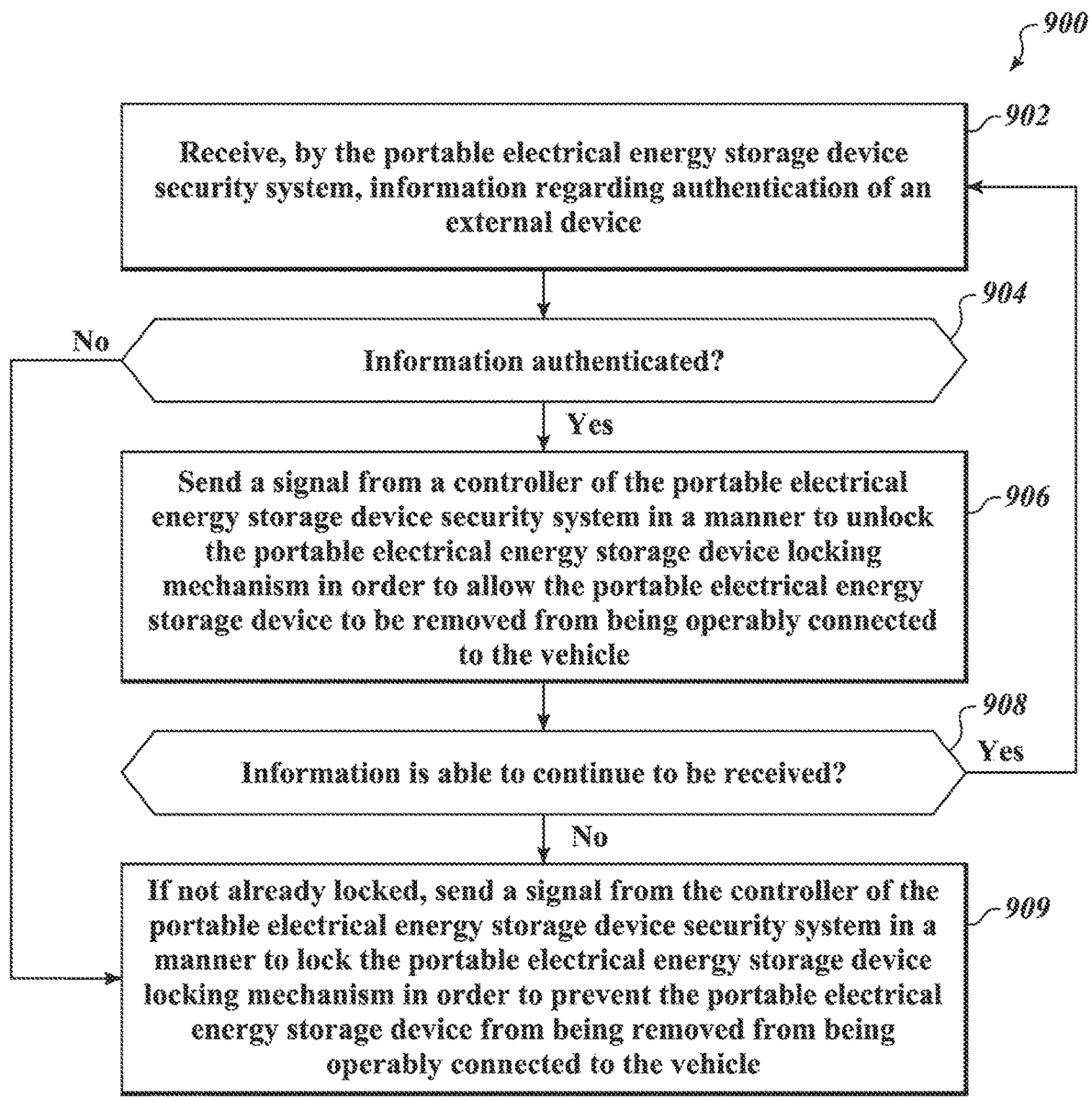
FIG. 9 is a flow diagram showing a low level method of operating the locking mechanism controller of FIGS. 3-6, according to one non-limiting illustrated embodiment, including sending a signal to lock and unlock the portable electrical energy storage device locking mechanism, useful in the method of FIG. 7 and FIG. 8.

As illustrated, the ROM 412, or some other one of the non-transitory processor- or computer-readable storage media 412, 414, 416, stores instructions and/or data or values for variables or parameters. The sets of data may take a variety of forms, for example a lookup table, a set of records in a database, etc. The instructions and sets of data or values are executable by the controller 410. Execution of the instructions and sets of data or values causes the controller 410 to perform specific acts to compare a code received from an external device and cause the locking mechanism controller 306 to generate control signals to lock or unlock the portable electrical energy storage device locking mechanism 320 based on the comparison. Also, such acts may include, for example, operations implementing a pseudo-random number to generate a rolling code as described above. Specific operation of the locking mechanism controller 306 is described herein and also below with reference to various flow diagrams (FIGS. 7-9).

The controller 410 may use RAM 414 in a conventional fashion, for volatile storage of instructions, data, etc. The controller 410 may use data store 416 to log or retain information, for example, information regarding user profile information, vehicle profile information, security codes, credentials, security certificates, passwords, vehicle information, etc. The instructions are executable by the controller 410 to control operation of the locking mechanism controller 306 in response to input from remote systems such as those of external devices including but not limited to: charging devices, vehicles, user identification devices (cards, electronic keys, etc.) vehicles, collection, charging and distribution machines, collection, charging and distribution machine service systems, service centers, user mobile devices, user vehicles, and end user or operator input.

The controller 410 may also receive signals from various sensors and/or components of an external device via the communications subsystem 406 of the locking mechanism controller 306. This information may include information that characterizes or is indicative of the authenticity, authorization level, operation, status, or condition of such components and/or external devices.

The communications subsystem 406 may include one or more communications modules or components which facilitate communications with the various components of the collection, charging and distribution machine 102 of FIG. 1 (e.g., such as to receive a security code) and/or of other external devices and also, such that data may be exchanged between the locking mechanism controller 306 and the external devices for authentication purposes. The communications subsystem 406 may provide wired and/or wireless communications. The communications subsystem 406 may include one or more ports, wireless receivers, wireless transmitters or wireless transceivers to provide wireless signal paths to the various remote components or systems. The communications subsystem 406 may, for example, include components enabling short range (e.g., via Bluetooth, near field communication (NFC), radio frequency identification (RFID) components and protocols) or longer range wireless communications (e.g., over a wireless LAN, satellite, or cellular network) and may include one or more modems or one or more Ethernet or other types of communications cards or components for doing so. The remote communications subsystem 406 may include one or more bridges or routers suitable to handle network traffic including switched packet type communications protocols (TCP/IP), Ethernet or other networking protocols.

In some embodiments, some or all of the components of the locking mechanism controller 306 may be located outside of the portable electrical energy storage device 106z as a separate device that actuates one or more actuators 502 (shown in FIG. 6 and FIG. 7) of the portable electric al energy storage device 106z (e.g., by a wireless control signal) sent via the communications subsystem 406.

The power interface 420 is controllable by the controller 410 and is configured to receive power from the portable electrical energy storage device 106z via connection 314a to provide power to the locking mechanism controller 306 and also to the portable electrical energy storage device locking mechanism 320 (via connection 314b). Also, the power interface 420 is controllable by the controller 410 and is configured to receive power from an auxiliary source other than the portable electrical energy storage device 106z via connection 314c to provide power to the portable electrical energy storage device locking mechanism 320 and/or the locking mechanism controller 306 should the portable electrical energy storage device 106z be not able to provide enough power to operate the portable electrical energy storage device locking mechanism 320 and/or the locking mechanism controller 306. The power interface 420 includes various components operable for performing the above functions such as electrical transformers, converters, rectifiers, etc.

Figure 5:
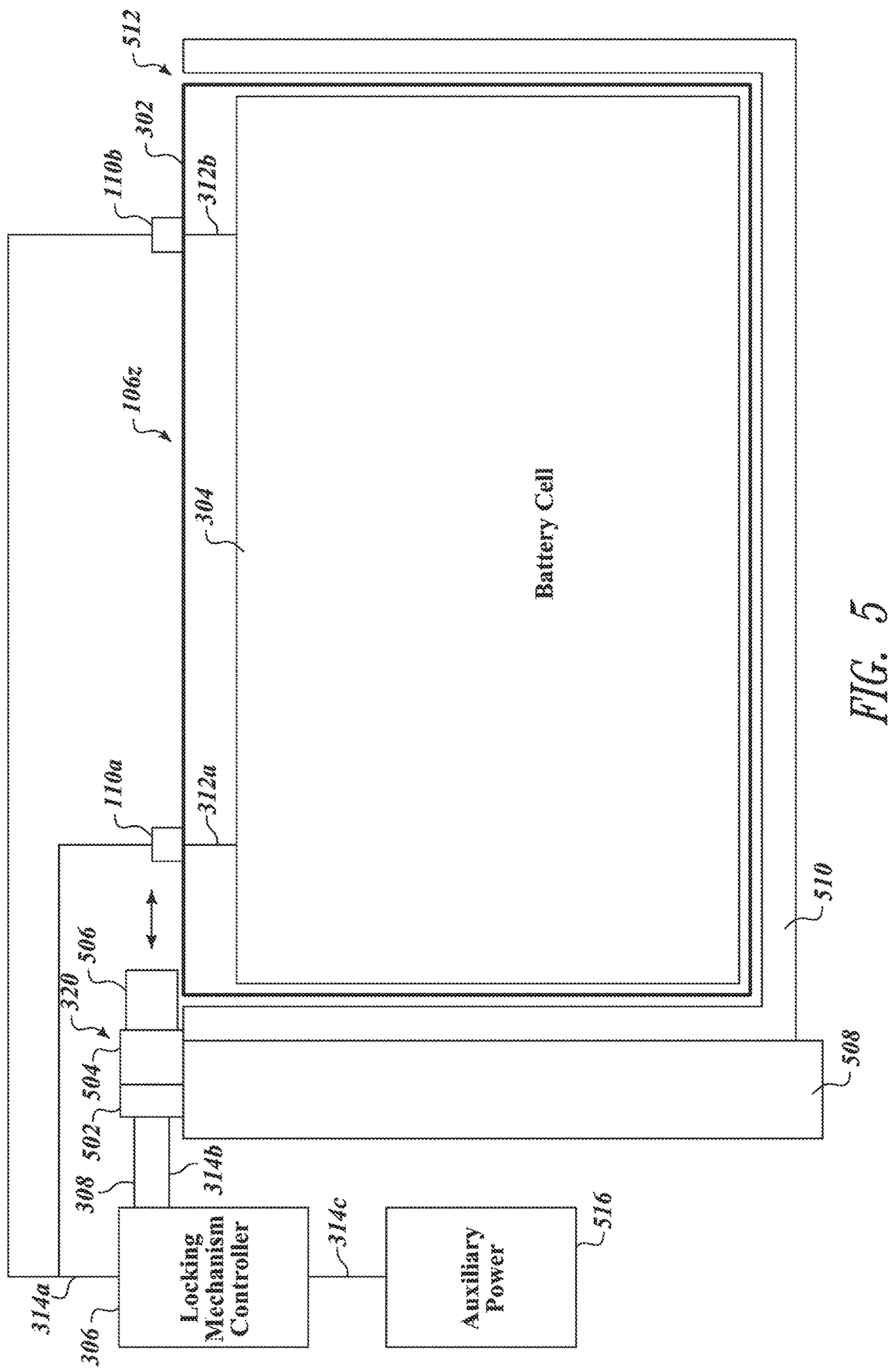
FIG. 5 is a cross-sectional elevation view of the portable electrical energy storage device of FIG. 1 and FIG. 3 coupled to the portable electrical energy storage device physical security system of FIG. 3 and locked in an operable position within the scooter of FIG. 1 and FIG. 3, according to one non-limiting illustrated embodiment.

FIG. 5 shows a cross-sectional elevation view of the portable electrical energy storage device 106z of FIG. 1 and FIG. 3 coupled to the portable electrical energy storage device physical security system of FIG. 3 and locked in an operable position within the scooter 108 of FIG. 1 and FIG. 3, according to one non-limiting illustrated embodiment.

Shown is a portable electrical energy storage device holder 510, a part of a vehicle 508, a portable electrical energy storage device housing 302, electrical terminals 110a, 110b, a battery cell 304, a locking mechanism controller 306, a portable electrical energy storage device locking mechanism 320 and an auxiliary power source 516. The battery cell 304 may be any rechargeable type of electrochemical cell that converts stored chemical energy into electrical energy. Also, the battery cell 304 may comprise any type of rechargeable ultracapacitor array or fuel cell array. As described above, the electrical terminals 110a, 110b are accessible from an exterior of the portable electrical energy storage device 106z. The electrical terminals 110 allow charge to be delivered from the portable electrical energy storage device 106z, as well as allow charge to be delivered to the portable electrical energy storage device 106z for charging or recharging the same through conductive terminal connections 312a and 312b to the battery cell 304. While illustrated in FIG. 3 as posts, the electrical terminals 110a and 110b may take any other form which is accessible from an exterior of the portable electrical energy storage device 106z, including electrical terminals positioned within slots in the battery housing 302.

The portable electrical energy storage device locking mechanism 320 is located outside the portable electrical energy storage device housing 302 and fixedly attached to a vehicle part 508 (e.g., a vehicle frame or chassis) that is attached to a holder 510 in which the portable electrical energy storage device 106z is placed. The holder 510 has a top opening 512 through which the portable electrical energy storage device 106z may be placed into the holder 510 and removed from the holder 510. Once the portable electrical energy storage device 106z is placed in the holder 510, the holder 510 surrounds the portable electrical energy storage device 106z except at the top opening 512. The portable electrical energy storage device locking mechanism 320 has a slidable bolt 506 which partially covers the opening 512 (as shown in FIG. 5) in a locked state to block passage of the portable electrical energy storage device 106z through the opening 512 and thus prevent the portable electrical energy storage device 106z from being able to be removed from the holder 510. The slidable bolt 506 is slidable on a bolt track or through bolt housing 504 fixedly attached to the vehicle part 508. When the portable electrical energy storage device locking mechanism 320 is in an unlocked state, the slidable bolt 506 is retracted (not shown) into the bolt housing 504 to not cover the opening 512 and thus allow passage of the portable electrical energy storage device 106z through the opening 512 of the holder 510 for the portable electrical energy storage device 106z to be removed.

The portable electrical energy storage device locking mechanism 320 is coupled to the locking mechanism controller 306 via a control line 308 and power line 314b. For example, one or more engine control signals received from the locking mechanism controller 306 via control line 308 may affect the operation of one or more actuators 502 (only one illustrated) to cause the slidable bolt 506 to move. For instance, a control signal may cause movement of an actuator 502 between a first and a second position or change a magnetic field produced by the actuator 502. The actuator

502 may take any of a variety of forms, including but not limited to a solenoid, an electric motor such as a stepper motor, or an electromagnet. The actuator 502 may alternatively be coupled to operate a different latch, lock or other type of retainer mechanism for the portable electrical energy storage device 106z.

The locking mechanism controller 306 is configured to receive power from the portable electrical energy storage device 106z via connection 314a to provide power to the locking mechanism controller 306 and also to the portable electrical energy storage device locking mechanism 320 (via connection 314b). Also, the locking mechanism controller 306 is optionally configured to receive power from an auxiliary source 516 other than the portable electrical energy storage device 106z via connection 314c to provide power to the portable electrical energy storage device locking mechanism 320 and/or the locking mechanism controller 306 should the portable electrical energy storage device 106z be not able to provide enough power to operate the portable electrical energy storage device locking mechanism 320 and/or the locking mechanism controller 306.

The housing 302 may provide a protection to prevent or deter tampering, and may be formed of suitably strong and resilient materials (e.g., ABS plastic). Such may not only prevent or deter tampering, but may leave a visible indication of any tampering attempts. For example, the housing 302 may include a strong outer layer of a first color (e.g., black) within an inner layer of a second color (e.g., fluorescent orange) therebeneath. Such will render attempts to cut through the housing 302 visibly apparent.

It is also noted that the housing 302 may serve as a frangible substrate, or a frangible substrate may be secured to an inner portion of the housing 302, for instance, via suitable adhesives. Thus, tampering with the housing may break or damage a circuit connection, rendering the portable electrical energy storage device 106z inoperable.

Figure 6:
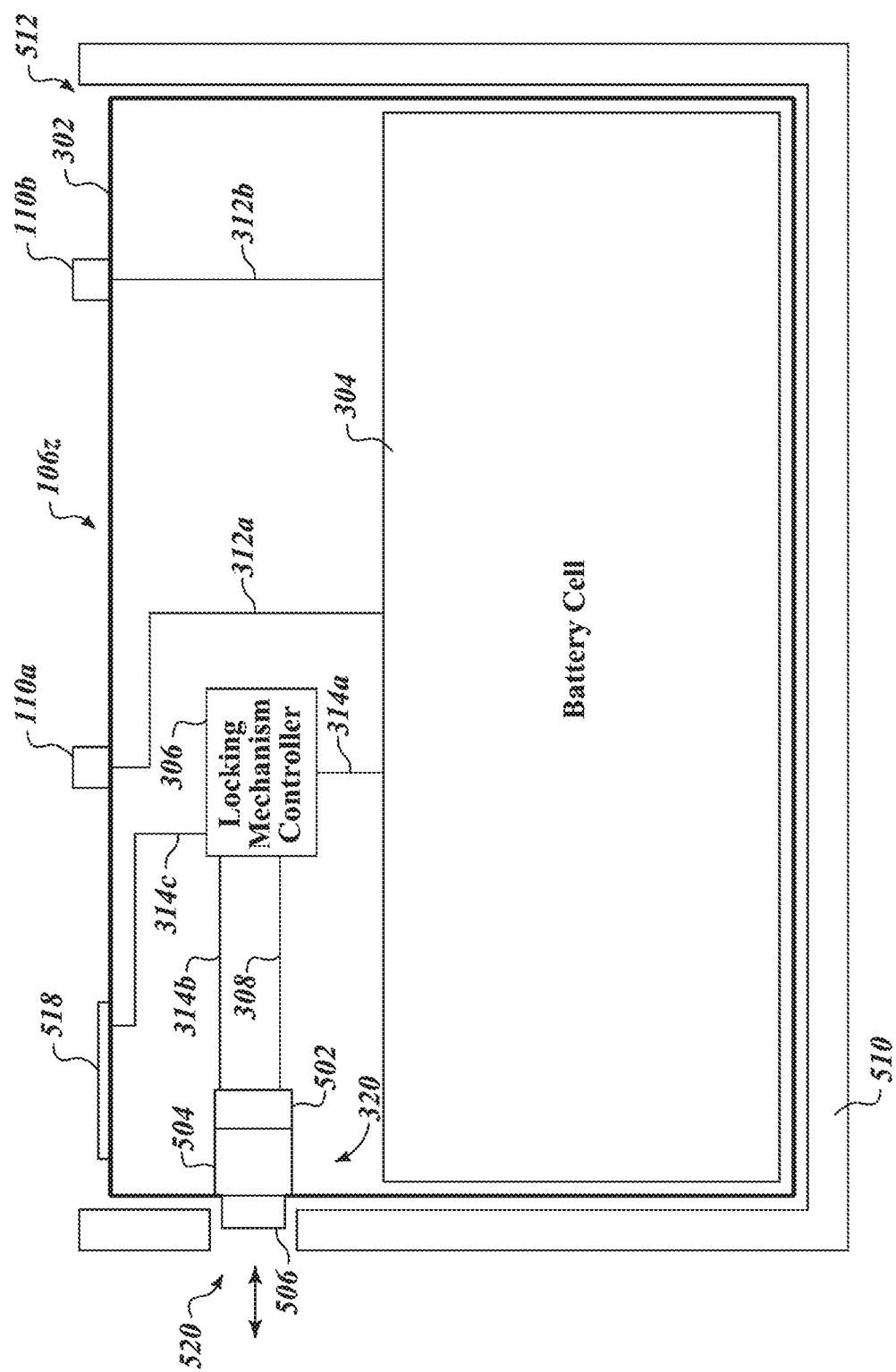
FIG. 6 is a cross-sectional elevation view of an alternative embodiment of the portable electrical energy storage device of FIG. 1 and FIG. 3 in which the portable electrical energy storage device physical security system of FIG. 3 is integrated with and part of the portable electrical energy storage device of FIG. 1 and FIG. 3, according to one non-limiting illustrated alternative embodiment.

FIG. 6 shows a cross-sectional elevation view of an alternative embodiment the portable electrical energy storage device 106z of FIG. 1 and FIG. 3 in which the portable electrical energy storage device physical security system of FIG. 3 is integrated with and part of the portable electrical energy storage device 106z of FIG. 1 and FIG. 3, according to one non-limiting illustrated alternative embodiment.

Shown is a portable electrical energy storage device holder 510, a portable electrical energy storage device housing 302, electrical terminals 110a, 110b, a battery cell 304, a locking mechanism controller 306, a portable electrical energy storage device locking mechanism 320 and an access panel 518 to plug in an auxiliary power source. The battery cell 304 is any rechargeable type of electrochemical cell that converts stored chemical energy into electrical energy. As described above, the electrical terminals 110a, 110b are accessible from an exterior of the portable electrical energy storage device 106z.

The portable electrical energy storage device locking mechanism 320 is located inside the portable electrical energy storage device housing 302 and fixedly attached to the interior of the portable electrical energy storage device housing 302. The holder 510 has a top opening 512 through which the portable electrical energy storage device 106z may be placed into the holder 510 and removed from the holder 510. Once the portable electrical energy storage device 106z is placed in the holder 510, the holder 510 surrounds the portable electrical energy storage device 106z except at the top opening 512. The portable electrical energy storage device locking mechanism 320 has a slidable bolt 506 which is configured to slide on a bolt track or through bolt housing 504 fixedly attached to an interior wall of the portable electrical energy storage device housing 502. The slidable bolt 506 is configured to slide through an opening 520 in the side of the housing 302 and into an opening 520 in the side wall of the holder 510 aligned with the opening in the side of the housing 302 to block passage of the portable electrical energy storage device 106z through the top opening 512 of the holder 510, and thus prevent the portable electrical energy storage device 106z from being able to be removed from the holder 510 (as shown in FIG. 6). When the portable electrical energy storage device locking mechanism 320 is in an unlocked state, the slidable bolt 506 is retracted (not shown) back into the bolt housing 504 inside the portable electrical energy storage device 106z, and thus allows passage of the portable electrical energy storage device 106z through the top opening 512 of the holder 510 for the portable electrical energy storage device 106z to be removed.

The portable electrical energy storage device locking mechanism 320 is coupled to the locking mechanism controller 306 via a control line 308 and power line 314b. For example, one or more engine control signals received from the locking mechanism controller 306 via control line 308 may affect the operation of one or more actuators 502 (only one illustrated) to cause the slidable bolt 506 to move. For instance, a control signal may cause movement of an actuator 502 between a first and a second position or change a magnetic field produced by the actuator 502. The actuator 502 may take any of a variety of forms, including but not limited to a solenoid, an electric motor such as a stepper motor, or an electromagnet. The actuator 502 may alternatively be coupled to operate a different latch, lock or other type of retainer mechanism for the portable electrical energy storage device 106z.

The locking mechanism controller 306 is configured to receive power from the portable electrical energy storage device 106z via connection 314a to provide power to the locking mechanism controller 306 and also to the portable electrical energy storage device locking mechanism 320 (via power line 314b). Also, the locking mechanism controller 306 is configured to receive power from an auxiliary source other than the portable electrical energy storage device 106z via line 314c. The auxiliary source may be connected to line 314b through an access panel 518 in the housing 302 to provide power to the portable electrical energy storage device locking mechanism 320 and/or the locking mechanism controller 306 should the portable electrical energy storage device 106z be not able to provide enough power to operate the portable electrical energy storage device locking mechanism 320 and/or the locking mechanism controller 306.

The housing 302 may provide protection to prevent or deter tampering, and may be formed of suitably strong and resilient materials (e.g., ABS plastic). Such may not only prevent or deter tampering, but may leave a visible indication of any tampering attempts. For example, the housing 302 may include a strong outer layer of a first color (e.g., black) within an inner layer of a second color (e.g., fluorescent orange) therebeneath. Such will render attempts to cut through the housing 302 visibly apparent.

It is also noted that the housing 302 may serve as a frangible substrate, or a frangible substrate may be secured to an inner portion of the housing 302, for instance, via suitable adhesives. Thus, tampering with the housing may break or damage a circuit connection, rendering the portable electrical energy storage device 106z inoperable.

FIG. 7 shows a high level method 700 of operating the locking mechanism controller of FIGS. 3-6, according to one non-limiting illustrated embodiment.

At 702, the portable electric storage device security system receives information regarding authentication of an external device such as the collection, charging and distribution machine 102.

At 704, the portable electrical energy storage device security system makes a determination regarding unlocking the portable electrical energy storage device locking mechanism 320 to allow the portable electrical energy storage device 106z to be removed from being operably connected to a vehicle, based on the information regarding authentication.

FIG. 8 shows a low level method 800 of operating the locking mechanism controller of FIGS. 3-6, according to one non-limiting illustrated embodiment, including accepting the portable electrical energy storage device charge, useful in the method of FIG. 7.

At 802, the portable electric storage device security system receives the information regarding authentication via a wireless signal transmitted from the collection, charging and distribution machine 102. The wireless signal received from the collection, charging and distribution machine 102 is not detectable outside a specified maximum range from a communications module of the portable electrical energy storage device security system.

FIG. 9 shows a low level method 900 of operating the portable electrical energy storage device security system controller 306 of FIGS. 3 and 4, according to one non-limiting illustrated embodiment, including determining how much energy to release, based on a vehicle performance profile of the vehicle, useful in the method of FIG. 8.

At 902, the portable electric storage device security system receives information regarding authentication of an external device such as the collection, charging and distribution machine 102.

At 904 the portable electric storage device security system determines whether the information received is authentic.

At 906, if the information received was determined to be authentic (e.g., by matching a code received), then the portable electrical energy storage device security system sends a signal from locking mechanism controller 306 in a manner to unlock the portable electrical energy storage device locking mechanism 320 in order to allow the portable electrical energy storage device to be removed from being operably connected to the vehicle.

At 908, the portable electric storage device security system determines whether the information is able to continue to be received. For example, the information may not be able to continue to be received once the locking mechanism controller 306 can no longer receive the wireless signal from the collection, charging and distribution machine 102 (e.g., after the scooter or motorbike has already exchanged the portable electrical energy storage device 106z at the collection, charging and distribution machine 102 and is no longer within range of the collection, charging and distribution machine 102 wireless signal 126).

At 909, if the information received was determined not to be authentic or the information is not able to continue to be received by the portable electric storage device security system, and if the portable electrical energy storage device locking mechanism 320 is not already locked, the portable electrical energy storage device security system sends a signal from the locking mechanism controller 306 in a manner to lock the portable electrical energy storage device locking mechanism 320 in order to prevent the portable electrical energy storage device from being removed from being operably connected to the vehicle. If the information is able to continue to be received by the portable electric storage device security system, the method 900 repeats by proceeding again to 902 to perform the authentication of the information. The method may repeat at periodic intervals or continuously.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled APPARATUS, METHOD AND ARTICLE FOR A POWER STORAGE DEVICE COMPARTMENT' and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012, U.S. application Ser. No. 13/559,314 filed on Jul. 26, 2012, naming Hok-Sum Horace Luke, Matthew Whiting Taylor and Huang-Cheng Hung as inventors and entitled "APPARATUS, METHOD AND ARTICLE FOR COLLECTION, CHARGING AND DISTRIBUTING POWER STORAGE DEVICES, SUCH AS BATTERIES", U.S. application Ser. No. 13/559,038 filed on Jul. 26, 2012, naming Hok-Sum Horace Luke and Matthew Whiting Taylor as inventors and entitled "APPARATUS, METHOD AND ARTICLE FOR AUTHENTICATION, SECURITY AND CONTROL OF POWER STORAGE DEVICES SUCH AS BATTERIES" U.S. application Ser. No. 13/559,264 filed on Jul. 26, 2012 naming Hok-Sum Horace Luke and Matthew Whiting Taylor as inventors and entitled "DYNAMICALLY LIMITING VEHICLE OPERATION FOR BEST EFFORT ECONOMY" U.S. application Ser. No. 13/559,390 filed on Jul. 26, 2012, naming Ching Chen, Hok-Sum Horace Luke, Matthew Whiting Taylor, Yi-Tsung Wu as inventors and entitled "APPARATUS, METHOD AND ARTICLE FOR PROVIDING VEHICLE DIAGNOSTIC DATA", U.S. application Ser. No. 13/559,343 filed on Jul. 26, 2012, naming Yi-Tsung Wu, Matthew Whiting Taylor, Hok-Sum Horace Luke and Jung-Hsiu Chen as inventors and entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE", and U.S. application Ser. No. 13/559,064 filed on Jul. 26, 2012, naming Hok-Sum Horace Luke, Yi-Tsung Wu, Jung-Hsiu Chen, Yulin Wu, Chien Ming Huang, TsungTing Chan, Shen-Chi Chen and Feng Kai Yang as inventors and entitled "APPARATUS, METHOD AND ARTICLE FOR RESERVING POWER STORAGE DEVICES AT RESERVING POWER STORAGE DEVICE COLLECTION, CHARGING AND DISTRIBUTION MACHINES" are incorporated herein by reference, in their entirety. Aspects of the embodiments can be modified, if necessary, to employ systems, circuits and concepts of the various patents, applications and publications to provide yet further embodiments.

While generally discussed in the environment and context of collection, charging and distribution of portable electrical energy storage devices for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A back-end system, comprising:
a controller; and
a communications device coupled to the controller;
wherein the controller is configured to:
transmit, via the communications device, a set of information to authenticate a portable external device, wherein the set of information including a time-sensitive code;

receive, via the communications device, a response code from the portable external device, wherein the response code is generated based on the time-sensitive code; and based on the response code, determine to transmit a signal, via the communications device, to unlock a locking mechanism associated with a portable electrical energy storage device.

2. The system of claim 1, wherein the portable external device is a mobile computing device, and wherein the portable electrical energy storage device is a battery.

3. The system of claim 1, wherein the locking mechanism is configured to lock the portable electrical energy storage device in a vehicle.

4. The system of claim 1, wherein the portable electrical energy storage device is locked in a vehicle by the locking mechanism, and wherein the signal is transmitted to the vehicle to unlock the locking mechanism.

5. The system of claim 1, wherein the locking mechanism is positioned in the portable electrical energy storage device, and wherein the signal is transmitted to the portable electrical energy storage device to unlock the locking mechanism.

6. The system of claim 1, wherein the signal is a first signal, and wherein the controller is configured to transmit a second signal to a vehicle to allow the portable electrical energy storage device to be removed from the vehicle.

7. The system of claim 1, wherein the controller is configured to collect data from the portable electrical energy storage device.

8. The system of claim 1, wherein the controller is configured to transmit data to the portable electrical energy storage device.

9. The system of claim 1, wherein the controller is configured to collect data from a collection, charging and distribution machine within a vicinity of the portable external device.

10. The system of claim 1, wherein the controller is configured to transmit data to a collection, charging and distribution machine within a vicinity of the portable external device.

11. The system of claim 1, wherein the controller is configured to collect data from a vehicle service center within a vicinity of the portable external device.

12. The system of claim 1, wherein the controller is configured to transmit data to a vehicle service center within a vicinity of the portable external device.

13. The system of claim 1, wherein the controller is configured to verify whether the portable external device is in a vicinity of a collection, charging and distribution machine.

14. The system of claim 1, wherein the controller is configured to verify whether the portable external device is in a vicinity of a vehicle service center.

15. A method comprising:
transmitting, via a communications device, a set of information to authenticate a portable external device, wherein the set of information including a time-sensitive code;

receiving, via the communications device, a response code from the portable external device, wherein the response code is generated based on the time-sensitive code; and based on the response code, determining to transmit a signal, via the communications device, to unlock a locking mechanism associated with a portable electrical energy storage device.

16. The method of claim 15, further comprising transmitting the signal to a vehicle to allow the portable electrical energy storage device to be removed from the vehicle.

17. A method for collecting data from a portable electrical energy storage device, the method comprising:
transmitting, via a communications device, a set of information to authenticate a portable external device, wherein the set of information including a time-sensitive code;

receiving, via the communications device, a response code from the portable external device, wherein the response code is generated based on the time-sensitive code; and based on the response code, determining to collect data from the portable electrical energy storage device.

18. The method of claim 17, wherein the data is a first set of data, and wherein the method further comprises transmitting a second set of data to the portable electrical energy storage device.

19. The method of claim 17, wherein the data is a first set of data, and wherein the method further comprises collecting a second set of data from the portable external device.

20. The method of claim 17, wherein the data is a first set of data, and wherein the method further comprises collecting a second set of data from a collection, charging and distribution machine within a vicinity of the portable external device.

* * * * *